(12) United States Patent
Sun et al.

(10) Patent No.: US 12,219,334 B2
(45) Date of Patent: Feb. 4, 2025

(54) METHOD FOR IMPLEMENTING STEREO OUTPUT AND TERMINAL

(71) Applicant: HUAWEI TECHNOLOGIES CO., LTD., Guangdong (CN)

(72) Inventors: Ran Sun, Shanghai (CN); Chien Feng Yeh, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 375 days.

(21) Appl. No.: 17/794,465

(22) PCT Filed: Oct. 26, 2020

(86) PCT No.: PCT/CN2020/123656
§ 371 (c)(1),
(2) Date: Jul. 21, 2022

(87) PCT Pub. No.: WO2021/147415
PCT Pub. Date: Jul. 29, 2021

(65) Prior Publication Data
US 2023/0053104 A1 Feb. 16, 2023

(30) Foreign Application Priority Data
Jan. 22, 2020 (CN) .......................... 202010073798.8

(51) Int. Cl.
*H04R 5/04* (2006.01)
*H04M 1/03* (2006.01)
(Continued)

(52) U.S. Cl.
CPC .............. *H04R 5/04* (2013.01); *H04M 1/035* (2013.01); *H04M 1/6016* (2013.01); *H04M 1/72454* (2021.01)

(58) Field of Classification Search
CPC .... H04R 5/04; H04M 1/72454; H04M 1/035; H04M 1/6016
(Continued)

(56) References Cited
U.S. PATENT DOCUMENTS
8,600,084 B1 12/2013 Garrett
2001/0011993 A1 8/2001 Saarinen
(Continued)

FOREIGN PATENT DOCUMENTS
CN 1848032 A 10/2006
CN 101489167 A 7/2009
(Continued)

*Primary Examiner* — Mark G. Pannell

(57) ABSTRACT

A first sound element is connected to a left sound-emitting hole and an upper sound-emitting hole. A second sound element is connected to a right sound-emitting hole and the upper sound-emitting hole. A third sound element is connected to a lower sound-emitting hole. When the terminal is in a portrait mode, a processor controls the first sound element and the second sound element to play sound channels on different sides and emit a sound from the left sound-emitting hole and the right sound-emitting hole. When the terminal is in a landscape mode, the processor controls the first sound element and/or the second sound element to play a sound channel on one side and emit a sound from at least one of the left sound-emitting hole, the right sound-emitting hole, and the upper sound-emitting hole, and the processor controls the third sound element to play a sound channel on another side.

20 Claims, 17 Drawing Sheets

(51) Int. Cl.
*H04M 1/60* (2006.01)
*H04M 1/72454* (2021.01)

(58) Field of Classification Search
USPC .................................................... 455/569.1
See application file for complete search history.

(56) References Cited

U.S. PATENT DOCUMENTS

| | | | |
|---|---|---|---|
| 2009/0189973 | A1 | 7/2009 | Root et al. |
| 2010/0210310 | A1 | 8/2010 | Inoue |
| 2012/0195447 | A1* | 8/2012 | Hiruma .................. H04S 7/303 |
| | | | 381/306 |
| 2018/0288201 | A1* | 10/2018 | Lee ....................... H04M 1/026 |
| 2018/0310095 | A1* | 10/2018 | Wyer ...................... H04R 1/028 |
| 2021/0168230 | A1* | 6/2021 | Baker ................... G06F 1/1698 |

FOREIGN PATENT DOCUMENTS

| | | |
|---|---|---|
| CN | 201681625 U | 12/2010 |
| CN | 102597946 A | 7/2012 |
| CN | 103167383 A | 6/2013 |
| CN | 203734829 U | 7/2014 |
| CN | 103974167 A | 8/2014 |
| CN | 104640029 A | 5/2015 |
| CN | 204667260 U | 9/2015 |
| CN | 106550141 A | 3/2017 |
| CN | 106658288 A | 5/2017 |
| CN | 106791031 A | 5/2017 |
| CN | 106998521 A | 8/2017 |
| CN | 206948401 U | 1/2018 |
| CN | 109040384 A | 12/2018 |
| CN | 109257496 A | 1/2019 |
| CN | 109511029 A | 3/2019 |
| CN | 110324470 A | 10/2019 |
| CN | 110580141 A | 12/2019 |
| CN | 110661916 A | 1/2020 |
| CN | 110677791 A | 1/2020 |
| CN | 111294438 A | 6/2020 |
| EP | 2129165 A2 | 12/2009 |
| EP | 1868357 B1 | 1/2011 |
| JP | 2009081743 A | 4/2009 |

* cited by examiner

METHOD FOR IMPLEMENTING STEREO OUTPUT AND TERMINAL

CROSS-REFERENCE TO RELATED APPLICATIONS

This application is a national stage of International Application No. PCT/CN2020/123656, filed on Oct. 26, 2020, which claims priority to Chinese Patent Application No. 202010073798.8, filed on Jan. 22, 2020. Both of the aforementioned applications are hereby incorporated by reference in their entireties.

TECHNICAL FIELD

This application relates to the field of stereo implementation technologies, and more specifically, to a method for implementing stereo output and a terminal.

BACKGROUND

With the continuous development of terminal technologies, an electronic device such as a mobile phone is gradually becoming a main platform for streaming media and enjoying content. To fit clearer, brighter, and larger-screen visual experience, more and more mobile terminals such as mobile phones are additionally provided with a stereo output function, to provide better listening experience for users.

An existing terminal is usually provided with a receiver at the top and a speaker at the bottom to play audio. In such an up-down speaker mode, stereo play can be implemented in only a landscape-mode play scenario. In a portrait-mode play scenario, because neither of the receiver and the speaker distinguishes between left and right sound channels, played sound content is the same, and stereo play cannot be implemented.

Currently, more and more users use short video and live broadcast applications, and short video platforms and live broadcast platforms use a portrait format to improve a sense of communication and immersion. Therefore, there are more and more portrait-mode play scenarios, and the user also has a requirement for improving sound quality in the portrait-mode play scenario.

SUMMARY

This application provides a method for implementing stereo output and a terminal, so that a terminal device can implement stereo output in a landscape mode and a portrait mode. This improves user experience.

According to a first aspect, a terminal is provided. The terminal includes a first sound-emitting unit, a second sound-emitting unit, a third sound-emitting unit, and a left sound-emitting hole, a right sound-emitting hole, an upper sound-emitting hole, and a lower sound-emitting hole that are disposed on four sides of the terminal. The first sound-emitting unit is separately connected to the left sound-emitting hole and the upper sound-emitting hole. The second sound-emitting unit is separately connected to the right sound-emitting hole and the upper sound-emitting hole. The third sound-emitting unit is connected to the lower sound-emitting hole. The terminal further includes a processing unit. When the terminal is configured to play stereo in a portrait mode, the processing unit controls the first sound-emitting unit and the second sound-emitting unit to play sound channels on different sides and emit a sound from the left sound-emitting hole and the right sound-emitting hole; or when the terminal is configured to play stereo in a landscape mode, the processing unit controls the first sound-emitting unit and/or the second sound-emitting unit to play a sound channel on one side and emit a sound from at least one of the left sound-emitting hole, the right sound-emitting hole, and the upper sound-emitting hole, and the processing unit controls the third sound-emitting unit to play a sound channel on another side.

The terminal provided in this embodiment of this application includes three sound-emitting units. The first sound-emitting unit and the second sound-emitting unit are respectively connected to sound-emitting holes in two directions of the terminal. A playing manner of the sound-emitting unit and a sound emitting position of the sound-emitting hole are controlled, so that stereo output can be implemented when the terminal is used in the landscape mode and the portrait mode.

Compared with an existing terminal, the terminal provided in this embodiment of this application is additionally provided with only one sound-emitting unit, to resolve a problem that there is no stereo during portrait-mode play of the terminal on the premise of utilizing space as efficiently as possible. This improves user experience.

It should be understood that in this embodiment of this application, the left sound-emitting hole is located on a left side of the terminal, the right sound-emitting hole is located on a right side of the terminal, the upper sound-emitting hole is located at an upper part of the terminal, and the lower sound-emitting hole is located at a lower part of the terminal.

Optionally, when the terminal is configured to play stereo in the portrait mode, the processing unit controls the first sound-emitting unit and the second sound-emitting unit to respectively play a left sound channel and a right sound channel.

Optionally, when the terminal is configured to play stereo in the landscape mode, the processing unit controls the first sound-emitting unit and/or the second sound-emitting unit to play a sound channel on one side in the left sound channel and the right sound channel, and controls the third sound-emitting unit to play a sound channel on the other side in the left sound channel and the right sound channel.

With reference to the first aspect, in a possible implementation, when the terminal is configured to play stereo in the portrait mode, the processing unit controls the first sound-emitting unit and the second sound-emitting unit to play sound channels on different sides, the first sound-emitting unit emits a sound from only the left sound-emitting hole, and the second sound-emitting unit emits a sound from only the right sound-emitting hole.

When the terminal is configured to play stereo in the portrait mode, the first sound-emitting unit emits a sound from only the left sound-emitting hole, and the second sound-emitting unit emits a sound from only the right sound-emitting hole, that is, neither the first sound-emitting unit nor the second sound-emitting unit emits a sound from the upper sound-emitting hole. This can avoid sound crosstalk of sound channels on different sides from the upper sound-emitting hole.

With reference to the first aspect, in a possible implementation, when the terminal device is configured to play stereo in the landscape mode, the processing unit controls the first sound-emitting unit and/or the second sound-emitting unit to play a sound channel on one side and emit a sound from only the upper sound-emitting hole, and the processing unit controls the third sound-emitting unit to play a sound channel on another side.

When the terminal device is configured to play stereo in the landscape mode, a sound played by the first sound-emitting unit and/or the second sound-emitting unit is emitted through only the upper sound-emitting hole, and a sound played by the third sound-emitting unit is emitted through the lower sound-emitting hole, so that a stereo effect is better.

With reference to the first aspect, in a possible implementation, when the terminal is configured to play stereo in the portrait mode, the processing unit further controls the third sound-emitting unit to play a bass sound channel.

The third sound-emitting unit plays the bass sound channel, which can enhance a bass effect and improve sound quality. Therefore, user experience is better.

With reference to the first aspect, in a possible implementation, when the terminal is used for a call, the processing unit controls a playing manner of a sound-emitting unit based on a call mode.

With reference to the first aspect, in a possible implementation, the call mode includes a receiver mode and a speaker mode. When the terminal is in the receiver mode, the processing unit controls the first sound-emitting unit and/or the second sound-emitting unit to play a mono voice and emit a sound from only the upper sound-emitting hole; or when the terminal is in the speaker mode, the processing unit controls at least one of the first sound-emitting unit, the second sound-emitting unit, and the third sound-emitting unit to play a mono voice.

When the terminal is used for a call in the receiver mode, the first sound-emitting unit and/or the second sound-emitting unit play/plays the mono voice, and a sound is emitted from only the upper sound-emitting hole. The first sound-emitting unit and/or the second sound-emitting unit consider/considers a function of a receiver on an existing terminal, so that privacy of call content can be ensured.

When the terminal is used for a call in the speaker mode, a plurality of sound-emitting units of the first sound-emitting unit, the second sound-emitting unit, and the third sound-emitting unit may play a voice. In this way, when a specific sound-emitting unit is blocked by an obstruction, another sound-emitting unit may also emit a sound.

Optionally, a sound-emitting unit used to emit a sound in the speaker mode may be customized or selected by a user. In this way, when a specific sound-emitting unit is damaged, another sound-emitting unit may also be used to emit a sound.

With reference to the first aspect, in a possible implementation, the terminal further includes control components. The control component is configured to control an open/closed state of a sound guide channel between the sound-emitting unit and a sound-emitting hole.

With reference to the first aspect, in a possible implementation, the control components are disposed on all sound guide channels that connect the first sound-emitting unit and the second sound-emitting unit to the outside of the terminal.

The control components are disposed on all the sound guide channels that connect the first sound-emitting unit and the second sound-emitting unit to the outside of the terminal, so that the open/closed state of each sound guide channel can be independently controlled, thereby increasing a possibility of sound-emitting path selection.

With reference to the first aspect, in a possible implementation, the control components are disposed on a sound guide channel between the first sound-emitting unit and the left sound-emitting hole and a sound guide channel between the second sound-emitting unit and the right sound-emitting hole.

The control components may be disposed only on some sound guide channels, and a sound guide channel between the first sound-emitting unit and the upper sound-emitting hole and a sound guide channel between the second sound-emitting unit and the upper sound-emitting hole are in a normally open state.

With reference to the first aspect, in a possible implementation, the control component includes a movable part and a fixed part, a movable part through hole is disposed on the movable part, a fixed part through hole is disposed on the fixed part, and the processing unit inputs a control signal to the control component, to control the movable part to move relative to the fixed part, and correspondingly control the movable part through hole to be connected to or staggered with the fixed part through hole.

With reference to the first aspect, in a possible implementation, the control component further includes a coil, the movable part is a magnet, and the coil receives an electrical signal input by the processing unit.

With reference to the first aspect, in a possible implementation, the terminal further includes a detection unit. The detection unit is configured to obtain usage status information of the terminal and output the obtained usage status information to the processing unit. The processing unit is configured to determine a usage scenario of the terminal based on the usage status information, and the usage scenario includes a landscape/portrait stereo play scenario and a call scenario.

Optionally, the detection unit includes a sensor, for example, a gyroscope, an acceleration sensor, an angular velocity sensor, or a touch sensor.

With reference to the first aspect, in a possible implementation, the first sound-emitting unit and the second sound-emitting unit are disposed at the upper part of the terminal, and the third sound-emitting unit is disposed at the lower part of the terminal.

The first sound-emitting unit and the second sound-emitting unit are disposed at the upper part of the terminal, so that an area frequently held by the user can be avoided, and the sound-emitting hole is prevented from being blocked by a hand of the user.

With reference to the first aspect, in a possible implementation, the first sound-emitting unit and the second sound-emitting unit are respectively disposed on the left side and the right side of the terminal, or the first sound-emitting unit and the second sound-emitting unit are disposed in the middle of the terminal.

The first sound-emitting unit and the second sound-emitting unit are respectively disposed on the left side and the right side of the terminal, so that a length of the sound guide channel between the sound-emitting unit and the sound-emitting hole can be reduced.

With reference to the first aspect, in a possible implementation, the first sound-emitting unit, the second sound-emitting unit, and the third sound-emitting unit are all speakers; or the first sound-emitting unit and the second sound-emitting unit are receivers, and the third sound-emitting unit is a speaker.

According to a second aspect, a method for implementing stereo output is provided and is applied to a terminal. The terminal includes a first sound-emitting unit, a second sound-emitting unit, a third sound-emitting unit, and a left sound-emitting hole, a right sound-emitting hole, an upper sound-emitting hole, and a lower sound-emitting hole that are disposed on four sides of the terminal, the first sound-emitting unit is separately connected to the left sound-emitting hole and the upper sound-emitting hole, the second sound-emitting unit is separately connected to the right sound-emitting hole and the upper sound-emitting hole, and the third sound-emitting unit is connected to the lower sound-emitting hole. The method includes: when the terminal is configured to play stereo in a portrait mode, controlling the first sound-emitting unit and the second sound-emitting unit to play sound channels on different sides and emit a sound from the left sound-emitting hole and the right sound-emitting hole; or when the terminal is configured to play stereo in a landscape mode, controlling the first sound-emitting unit and/or the second sound-emitting unit to play a sound channel on one side and emit a sound from at least one of the left sound-emitting hole, the right sound-emitting hole, and the upper sound-emitting hole. The processing unit controls the third sound-emitting unit to play a sound channel on another side.

The method for implementing stereo output provided in this embodiment of this application is applied to the terminal. The terminal includes three sound-emitting units. The first sound-emitting unit and the second sound-emitting unit are respectively connected to sound-emitting holes in two directions of the terminal. In this embodiment of this application, a playing manner of the sound-emitting unit and a sound emitting position of the sound-emitting hole are controlled, so that stereo output can be implemented when the terminal is used in the landscape mode and the portrait mode. This improves user experience.

With reference to the second aspect, in a possible implementation, when the terminal is configured to play stereo in the portrait mode, the first sound-emitting unit and the second sound-emitting unit are controlled to play sound channels on different sides, the first sound-emitting unit emits a sound from only the left sound-emitting hole, and the second sound-emitting unit emits a sound from only the right sound-emitting hole.

With reference to the second aspect, in a possible implementation, when the terminal is configured to play stereo in the portrait mode, the method further includes: controlling the third sound-emitting unit to play a bass sound channel.

With reference to the second aspect, in a possible implementation, the method further includes: when the terminal is used for a call, controlling a playing manner of a sound-emitting unit based on a call mode.

With reference to the second aspect, in a possible implementation, the call mode includes a receiver mode and a speaker mode. When the terminal is in the receiver mode, the first sound-emitting unit and/or the second sound-emitting unit are/is controlled to play a mono voice and emit a sound from only the upper sound-emitting hole; or when the terminal is in the speaker mode, at least one of the first sound-emitting unit, the second sound-emitting unit, and the third sound-emitting unit is controlled to play a mono voice.

With reference to the second aspect, in a possible implementation, the terminal further includes control components, and the control component is configured to control an open/closed state of a sound guide channel between the sound-emitting unit and the sound-emitting hole.

With reference to the second aspect, in a possible implementation, the control components are disposed on all sound guide channels that connect the first sound-emitting unit and the second sound-emitting unit to the outside of the terminal.

With reference to the second aspect, in a possible implementation, the control components are disposed on a sound guide channel between the first sound-emitting unit and the left sound-emitting hole and a sound guide channel between the second sound-emitting unit and the right sound-emitting hole.

With reference to the second aspect, in a possible implementation, the control component includes a movable part and a fixed part, a movable part through hole is disposed on the movable part, a fixed part through hole is disposed on the fixed part, and the control component is configured to receive a control signal, to control the movable part to move relative to the fixed part, and correspondingly control the movable part through hole to be connected to or staggered with the fixed part through hole.

With reference to the second aspect, in a possible implementation, the control component further includes a coil, and the movable part is a magnet. The method further includes: inputting an electrical signal to the coil.

With reference to the second aspect, in a possible implementation, the method further includes: obtaining usage status information of the terminal; and determining a usage scenario of the terminal based on the usage status information. The usage scenario includes a landscape/portrait stereo play scenario and a call scenario.

With reference to the second aspect, in a possible implementation, the first sound-emitting unit and the second sound-emitting unit are disposed at an upper part of the terminal, and the third sound-emitting unit is disposed at a lower part of the terminal.

With reference to the second aspect, in a possible implementation, the first sound-emitting unit and the second sound-emitting unit are respectively disposed on a left side and a right side of the terminal, or the first sound-emitting unit and the second sound-emitting unit are disposed in the middle of the terminal.

With reference to the second aspect, in a possible implementation, the first sound-emitting unit, the second sound-emitting unit, and the third sound-emitting unit are all speakers; or the first sound-emitting unit and the second sound-emitting unit are receivers, and the third sound-emitting unit is a speaker.

According to a third aspect, a terminal is provided. The terminal includes a plurality of sound-emitting units and a plurality of sound-emitting holes. The plurality of sound-emitting holes are distributed on four sides of the terminal, and the plurality of sound-emitting units are in a one-to-one correspondence with the plurality of sound-emitting holes. The terminal further includes a processing unit. When the terminal is configured to play stereo in a portrait mode, the processing unit controls sound-emitting units corresponding to sound-emitting holes on a left side and a right side of the terminal to separately play a left sound channel and a right sound channel, and controls sound-emitting units corresponding to sound-emitting holes on an upper side and a lower side of the terminal to play another sound channel; or when the terminal is configured to play stereo in a landscape mode, the processing unit controls sound-emitting units corresponding to sound-emitting holes on an upper side and a lower side of the terminal to separately play a left sound channel and a right sound channel, and controls sound-emitting units corresponding to sound-emitting holes on a left side and a right side of the terminal to play another sound channel.

The terminal in this embodiment of this application includes the plurality of sound-emitting units and the plurality of sound-emitting holes. Each sound-emitting unit can work independently, to provide multi-channel stereo audio play experience, enhance immersion during audio and video play, and improve user experience.

With reference to the third aspect, in a possible implementation, when the terminal is configured to play stereo in the portrait mode, the processing unit controls the sound-emitting units corresponding to the sound-emitting holes on the upper side and the lower side of the terminal to play a bass sound channel, or controls the sound-emitting units corresponding to the sound-emitting holes on the upper side and the lower side of the terminal to respectively play an upper sound channel and a lower sound channel.

With reference to the third aspect, in a possible implementation, when the terminal is configured to play stereo in the landscape mode, the processing unit controls the sound-emitting units corresponding to the sound-emitting holes on the left side and the right side of the terminal to respectively play the upper sound channel and the lower sound channel, or controls the sound-emitting units corresponding to the sound-emitting holes on the left side and the right side of the terminal to play the bass sound channel.

With reference to the third aspect, in a possible implementation, the terminal further includes a detection unit. The detection unit is configured to obtain usage status information of the terminal and output the obtained usage status information to the processing unit. The processing unit is configured to determine a playing manner of the sound-emitting unit based on the usage status information.

With reference to the third aspect, in a possible implementation, there are four sound-emitting units.

According to a fourth aspect, a computer-readable storage medium is provided, including instructions. When the instructions are run on an electronic device, a processor is enabled to implement the method according to any implementation in the second aspect when executing an executable code.

According to a fifth aspect, a computer program product including instructions is provided. When the computer program product is run on an electronic device, the electronic device is enabled to implement the method according to any implementation in the second aspect.

REFERENCE NUMERALS

Figure 1:
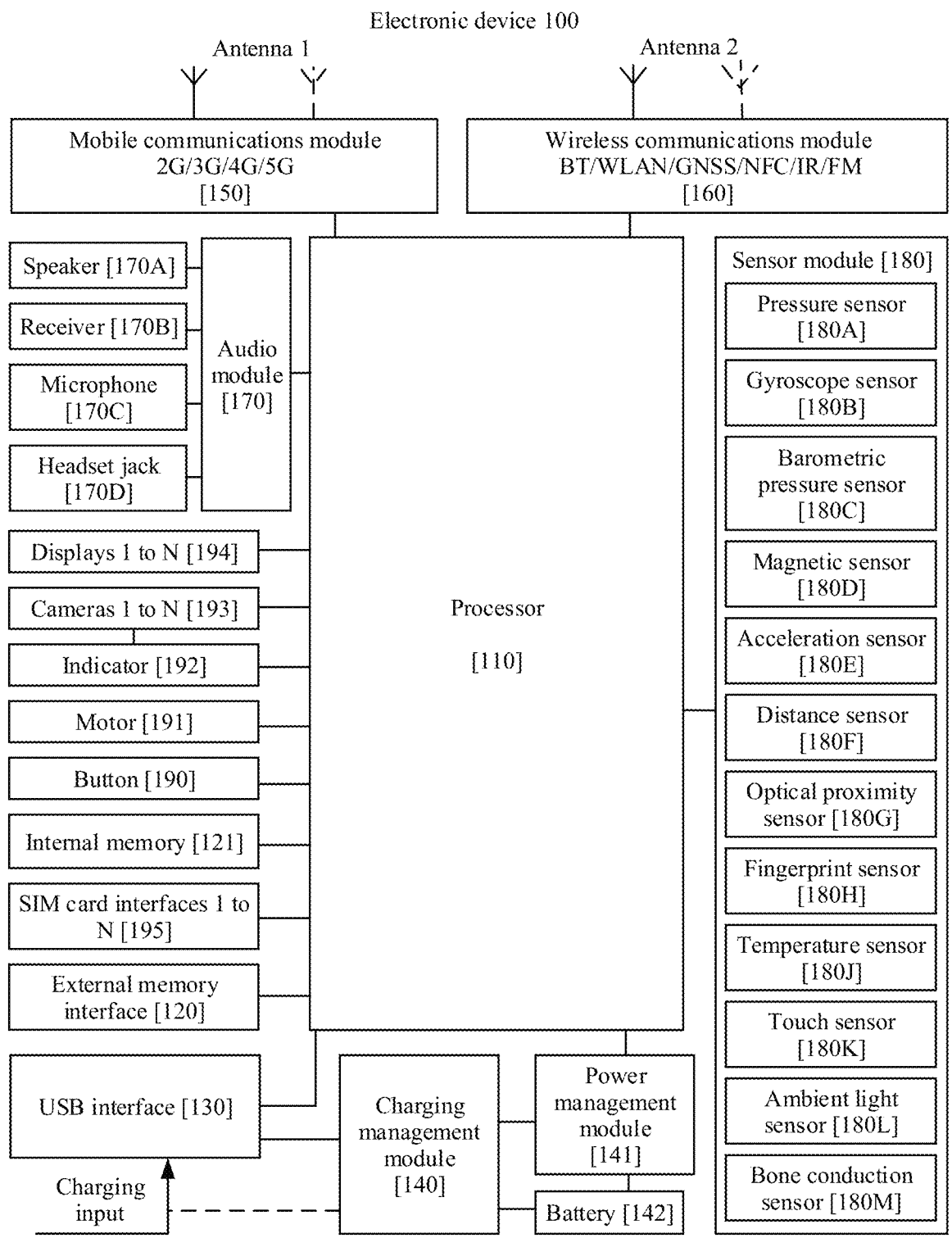
FIG. 1 is a schematic diagram of a hardware structure of an electronic device according to an embodiment of this application.

210—housing; 211—middle frame; 212—rear cover; 220—display; 230—receiver; 240—speaker; 310—first sound-emitting unit; 311—left sound-emitting hole; 312—left sound guide channel; 313—first upper sound guide channel; 320—second sound-emitting unit; 321—right sound-emitting hole; 322—right sound guide channel; 323—second upper sound guide channel; 330—third sound-emitting unit; 331—lower sound-emitting hole; 332—lower sound guide channel; 341—upper sound-emitting hole; 342—upper sound guide channel; 350—control component; 351—signal receiving module; 352—movable part; 3521—movable part body; 3522—movable through-hole; 353—fixed part; 3531—fixed part body; 3532—fixed through hole; 301—magnet; 302—voice coil; 303—vibrating diaphragm; 304—vibrating diaphragm spider; 305—basket; 306—frame; 307—case; 309—rear sound cavity; 610—detection unit; 620—processing unit; 630—channel opening and closing control unit; and 640—sound-emitting unit.

DESCRIPTION OF EMBODIMENTS

The following describes technical solutions of this application with reference to the accompanying drawings. It is clear that the described embodiments are merely some but not all of embodiments of this application.

It should be noted that, in descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more of the features.

In addition, in this application, directional terms such as "up", "down", "left", "right", "horizontal", and "vertical" are defined relative to directions or positions of components schematically placed in the accompanying drawings. It should be understood that these directional terms are relative concepts, are used for relative description and clarification, and are not used to indicate or imply that an indicated apparatus or component needs to have a specified direction or be constructed and operated in a specified direction. The terms may change accordingly with directions in which components in the accompanying drawings are placed, and therefore cannot be construed as a limitation on this application.

It should be further noted that, in embodiments of this application, a same reference numeral indicates a same component or a same part.

For ease of understanding, the following explains and describes related technical terms in embodiments of this application.

Stereo (stereo) is a stereophonic sound. A sound source has a definite spatial location. A sound has a definite direction source. Human hearing has the ability of distinguishing an orientation of the sound source. In particular, when a plurality of sound sources produce sounds at the same time, a person may sense a spatial location distribution status of each sound source by the hearing. When directly hearing these sounds in three-dimensional space, the person can sense orientations and levels of these sounds in addition to loudness, pitches, and timbre of these sounds. These sounds that are directly heard by the person and have spatial distribution characteristics such as orientations and levels are referred to as stereo in nature.

Sounds produced by the nature are stereo. However, if the stereo is processed such as recorded and amplified, and then is replayed, all sounds are played from one speaker. This replayed sound (compared with an original sound source) is not stereophonic, but is referred to as a mono voice. In this case, because all the sounds are emitted from the same speaker, an original sense of space (especially a sense of spatial distribution of sound groups) also disappears. If an entire system can restore the original sense of space to some extent from recording to replaying, this replayed sound that has the spatial distribution characteristics such as the orientation and the level to some extent is referred to as stereo in an acoustic technology. In embodiments of this application, "stereo" refers to this sound that is replayed by a sound play system and is stereophonic.

The reason why a person can distinguish a direction of a sound is that the person has two ears. The person determines, through the ears, an orientation of a sound source based on a distance difference, a time difference, an intensity difference, a frequency difference, and the like of the sound reaching the two ears. If spatial locations of different sound sources can be reflected during recording, and then sounds are replayed through at least two independent sound channels (two speakers), it is as if the person directly hears the sounds of the sound sources in an immersing manner when listening to a recording.

A sound channel (sound channel) indicates mutually-independent audio signals collected or played back at different spatial locations during sound recording or play. Therefore, a quantity of sound channels is a quantity of sound sources during sound recording or a quantity of corresponding speakers during sound play. Usually, only one sound channel is mainly used for voice communication, for example, a phone call and man-machine voice interaction. Audio in music or a video may have a mono sound channel (mono), dual sound channels (namely, a left sound channel and a right sound channel), or multiple sound channels (more than two sound channels).

Stereo includes dual sound channels or multiple sound channels. Stereo output through multiple sound channels is also referred to as surround stereo. For example, dual sound channels (the left sound channel and the right sound channel) are used to reproduce stereo. During sound replaying, two speakers between which a specific angle is formed are placed in space, and each speaker independently uses one sound channel to provide a signal. The signal of each sound channel is processed during recording. For example, the left sound channel is sound output generated by simulating an auditory range of a left ear of a person in an electronic device, and the right sound channel is sound output generated by simulating an auditory range of a right ear of the person in the electronic device. The left sound channel and the right sound channel are respectively emitted by a left speaker and a right speaker. The left speaker plays content of the left sound channel on a same side as the left ear of the person, and the right speaker plays content of the right sound channel on a same side as the right ear of the person. This can generate a stereo change effect such as from left to right or from right to left. In multi-channel sound field modes such as 3.1, 4.1, 5.1, 6.1, and 7.1, the left sound channel and the right sound channel may further be classified into front left and right sound channels, center left and right sound channels, rear left and right sound channels, surround left and right sound channels, and the like, and a "0.1" sound channel indicates a heavy bass sound channel.

The electronic device in embodiments of this application may include a handheld device, an in-vehicle device, a wearable device, a computing device, or another processing device connected to a wireless modem. The electronic device may further include a cellular phone (cellular phone), a smartphone (smartphone), a personal digital assistant (personal digital assistant, PDA) computer, a tablet computer, a portable computer, a laptop computer (laptop computer), a smart watch (smart watch), a smart wristband (smart wristband), a vehicle-mounted computer, or the like. A specific form of the electronic device is not specially limited in embodiments of this application. In some embodiments, the electronic device in embodiments of this application may be a terminal or a terminal device.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is used for asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset, to play audio through the headset. This interface may be further configured to connect to another electronic device such as an AR device.

It may be understood that an interface connection relationship between modules illustrated in this embodiment of this application is merely an example for description, and does not constitute a limitation on a structure of the electronic device 100. In some other embodiments of this application, the electronic device 100 may alternatively use an interface connection manner different from that in the foregoing embodiment, or a combination of a plurality of interface connection manners.

The charging management module 140 is configured to receive charging input from the charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may be alternatively disposed in the processor 110. In some other embodiments, the power management module 141 and the charging management module 140 may alternatively be disposed in a same device.

A wireless communications function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may further be multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in the same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diodes, QLED), or the like. In some embodiments, the electronic device 100 may include one or N displays 194, and N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, and N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. With reference to a structure of a biological neural network, for example, with reference to a transfer mode between neurons of a human brain, the NPU quickly processes input information, and can further continuously perform self-learning. Applications such as intelligent cognition of the electronic device 100 may be implemented through the NPU, for example, image recognition, facial recognition, speech recognition, and text understanding.

The external memory interface 120 may be configured to be connected to an external memory card such as a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (for example, audio data and an address book) and the like created when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode audio signals. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received by using the electronic device 100, the receiver 170B may be put close to a human ear to listen to a speech. The speaker 170A and the receiver 170B may be collectively referred to as a "sound-emitting unit".

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates with conductive materials. When force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation strength may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The gyroscope sensor 180B is also referred to as an angular velocity sensor, and may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyroscope sensor 180B may be further used in a navigation scenario and a motion-sensing game scenario. For example, a gyroscope can completely monitor displacement of a player's hand, to implement various game operation effects, such as switching from landscape to portrait and racing game turning.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in screen switching between a landscape mode and a portrait mode, a pedometer, or another application.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a flip cover mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and functional control of the electronic device 100.

The motor 191 may generate a vibration prompt. The motor 191 may be configured to provide an incoming call vibration prompt or a touch vibration feedback. For example, touch operations performed on different applications (for example, photo taking and audio playing) may correspond to different vibration feedback effects. The motor 191 may also correspond to different vibration feedback effects for touch operations performed on different areas of the display 194. Different application scenarios (for example, a time prompt, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, and N is a positive integer greater than 1. The SIM card interface 195 may support a nano-SIM card, a micro-SIM card, a SIM card, and the like. A plurality of cards may be inserted into the same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a hierarchical architecture, an event-driven architecture, a microkernel architecture, a microservice architecture, or a cloud architecture. In embodiments of this application, an Android system with a layered architecture is used as an example to describe a software structure of the electronic device 100.

Figure 2:
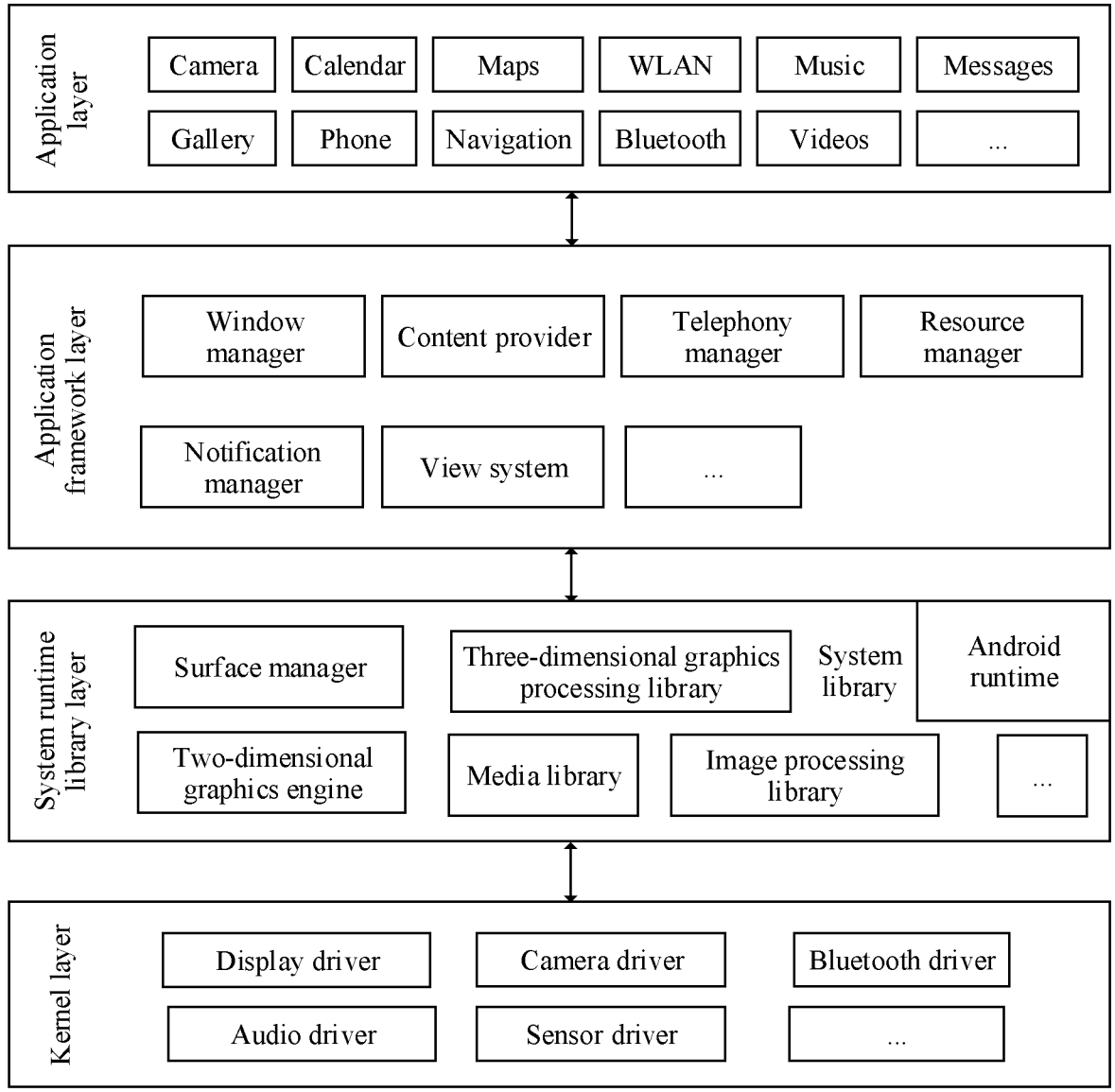
FIG. 2 is a schematic diagram of a software structure of an electronic device according to an embodiment of this application.

FIG. 2 is a block diagram of a software structure of the electronic device 100 in this embodiment of this application. In a layered architecture, software is divided into several layers, and each layer has a clear role and task. The layers communicate with each other through a software interface. In some embodiments, an Android system is divided into four layers, namely, an application layer, an application framework layer, a system runtime library layer (including an Android runtime (Android runtime) and a system library), and a kernel layer from top to bottom.

The application layer (applications) may include a series of application packages. As shown in FIG. 2, the application packages may include applications such as "camera", "gallery", "calendar", "phone", "maps", "navigation", "WLAN", "Bluetooth", "music", "videos", and "messages". An application is mainly based on a user interface (user interface), and is usually compiled by invoking an interface of the application framework layer by using a Java language.

The application framework layer (application framework) provides an application programming interface (application programming interface, API) and a programming framework for the application at the application layer. The application framework layer includes some predefined functions. As shown in FIG. 2, the application framework layer may include a window manager, a content provider, a view system, a telephony manager, a resource manager, a notification manager, and the like.

The window manager (window manager) is configured to manage a window program. The window manager may obtain a size of a display, determine whether there is a status bar, perform screen locking, take a screenshot, and the like.

The content provider (content provider) is configured to: store and obtain data, and enable the data to be accessed by an application. The data may include a video, an image, audio, calls that are made and received, a browsing history, a bookmark, an address book, and the like.

The view system (view system) includes visual controls, such as a control for displaying a text and a control for displaying an image. The view system may be configured to construct an application. A display interface may include one or more views. For example, a display interface including an SMS notification icon may include a text display view and a picture display view.

The telephony manager (telephony manager) is configured to provide a communication function of the electronic device 100, for example, management of a call status (including answering, declining, or the like).

The resource manager (resource manager) provides, for an application, various resources such as a localized character string, an icon, an image, a layout file, and a video file.

The notification manager (notification manager) enables an application to display notification information in the status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an announcement is given, the electronic device vibrates, or the indicator light blinks.

The system runtime library layer (libraries) may be divided into two parts: the system library and the Android runtime.

The Android runtime is an Android running environment and includes a core library and a virtual machine. The Android runtime is responsible for scheduling and management of the Android system.

The kernel library includes two parts: One part is a performance function that needs to be invoked by the Java language, and the other part is an Android kernel library.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library is a support of an application framework, is an important link connecting the application framework layer to the kernel layer, and may include a plurality of functional modules, for example, a surface manager (surface manager), a media library (media library), a three-dimensional graphics processing library (for example, an open graphics library for embedded systems (open graphics library for embedded systems, OpenGL ES)), and a 2D graphics engine (for example, a Skia database (Skia graphics library, SGL)).

The surface manager is configured to manage a display subsystem and provide fusion of 2D and 3D image layers for a plurality of applications.

The media library supports playing and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, compositing, layer processing, and the like.

The 2D graphics engine is a drawing engine for 2D drawing.

The kernel layer (kernel space) is a layer between hardware and software, and is used to provide essential functions of an operating system, such as file management, memory management, process management, and a network protocol stack. The kernel layer includes at least a display driver, a camera driver, an audio driver, a sensor driver and a Bluetooth driver.

For ease of understanding, an electronic device having the structures shown in FIG. 1 and FIG. 2 is used as an example for description in embodiments of this application. FIG. 1 shows only an example of an electronic device. This application may be applied to an intelligent device such as a mobile phone or a tablet computer. This is not limited in this application. In descriptions of embodiments of this application, the mobile phone is used as an example for description.

With the continuous development of terminal technologies, the electronic device such as the mobile phone is gradually becoming a main platform for streaming media and enjoying content. To fit clearer, brighter, and larger-screen visual experience, more and more mobile terminals such as mobile phones are additionally provided with a stereo output function, to provide better listening experience for a user.

Figure 3:
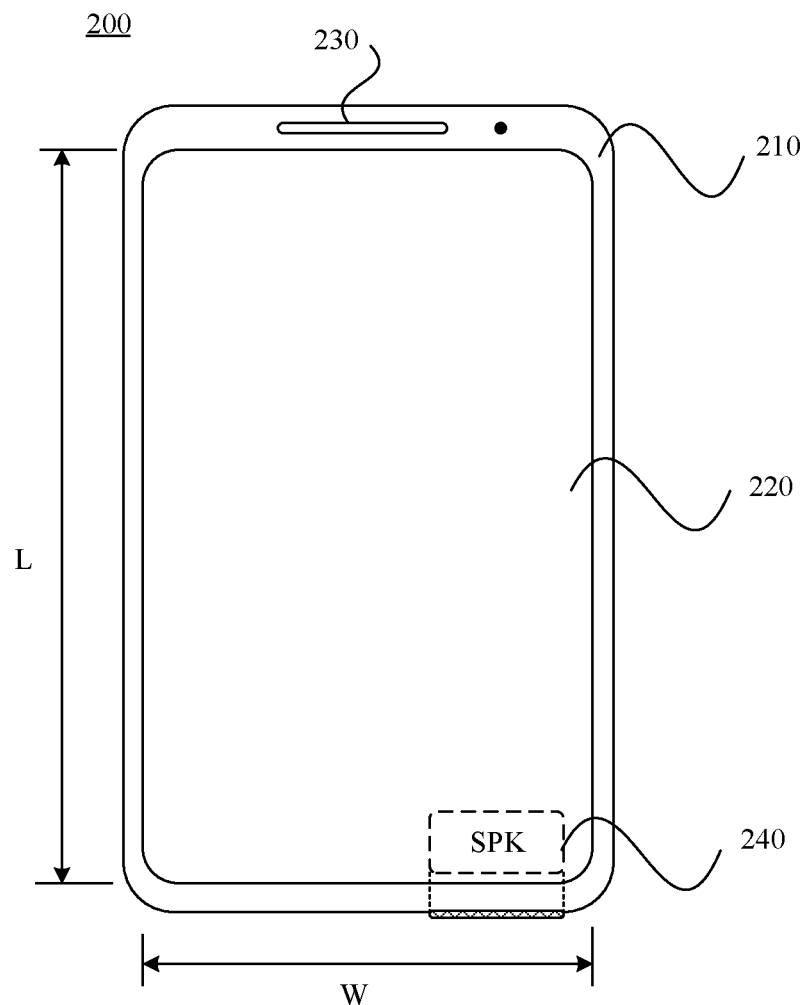
FIG. 3 is a schematic diagram of a structure of an existing electronic device.

FIG. 3 is a schematic diagram of a structure of an existing electronic device. As shown in FIG. 3, the electronic device 200 includes a housing 210, a display panel (display panel, DP) 220, a receiver (receiver, RCV) 230, a speaker (speaker, SPK) 240, and the like.

The housing 210 has an accommodation space for arranging various components of the electronic device 200, and the housing 210 may further protect the electronic device 200. The display 220, the receiver 230, and the speaker 240 are disposed in the accommodation space of the housing 210, and are connected to the housing 210. A material of the housing 210 may be metal, plastic, ceramic, or glass.

The display 220 is an example of the display 194 shown in FIG. 1. The display 220 may be a liquid crystal display (liquid crystal display, LCD), an organic light-emitting diode (organic light-emitting diode, OLED) display, or the like. The OLED display may be a flexible display or a rigid display. The display 220 may be a common regular screen, or may be an abnormal-shaped screen, a folded screen, or the like. For example, the display 220 may be relatively freely rotated and folded to form an arc, a sphere, a cylinder, or the like. The display 220 may be disposed on a front side of the electronic device 200, or may be disposed on a rear side of the electronic device 200, or may be separately disposed on a front side and a rear side of the electronic device 200. The front side of the electronic device 200 may be understood as a side facing a user when the user uses the electronic device 200, and the rear side of the electronic device 200 may be understood as a side facing back to the user when the user uses the electronic device 200.

The display 220 has a length-width ratio. For example, a ratio of a length (length) L to a width (width) W is 4:3, 16:9, 16:10, 18.5:9, 20:9, 21:9, or 15:9. The display 220 may display a video picture or a user interaction interface in a landscape or portrait mode. In an example in which the user is in a standing posture, a width direction of the display 220 in the portrait mode is approximately the same as a connection direction of two eyes (or two ears) of the user, and a length direction of the display 220 in the landscape mode is approximately the same as the connection direction of the two eyes (or the two ears) of the user. Generally, a shape of the display 220 is similar to an overall shape of the electronic device 200, for example, both are rectangles. The length direction of the display 220 is the same as a length direction of the electronic device 200, and the width direction of the display 220 is the same as a width direction of the electronic device 200. Therefore, in some embodiments, when the electronic device 200 is used vertically, it can be seen from FIG. 3 that the length direction of the electronic device 200 is an up-down direction of paper, the display 220 is displayed in the portrait mode, the top of the electronic device 200 is upward, and the bottom of the electronic device 200 is downward; or when the electronic device 20 is used horizontally, the length direction of the electronic device 200 is a left-right direction of paper, the display 220 is displayed in the landscape mode, the top of the electronic device 200 is leftward, the bottom is rightward, or the top is rightward, and the bottom is leftward. A landscape/portrait-mode display manner of the display 220 may be automatically adjusted based on a horizontal/vertical use posture and a placement direction of the electronic device 200, to ensure that content displayed on the display 220 can be easily viewed or operated by the user regardless of how the user uses the electronic device 200. When the display 220 changes from the portrait mode to the landscape mode, the electronic device 200 may rotate leftwards or rightwards. Alternatively, when the electronic device 200 switches between two types of landscape-mode postures, the display 220 may directly rotate 180°. In this way, a picture of the display 220 may be adjusted, based on a motion posture of the electronic device 200, to always face to the user.

Audio-visual content displayed on the display 220 has a landscape format and a portrait format. The audio-visual content in the landscape format is mainly applicable to landscape-mode display, and a picture size of the audio-visual content in the landscape format may adapt to a landscape ratio of the display 220. The audio-visual content in the portrait format is mainly applicable to portrait-mode display, and a picture size of the audio-visual content in the portrait format may adapt to a portrait ratio of the display 220. If a video in the portrait format is independently displayed in the landscape mode or a video in the landscape format is independently displayed in the portrait mode, there may be black borders on the picture. However, in a split-screen multi-task scenario, the user may watch a video in an upper small window and chat in a lower small window in a portrait-mode. In this case, there may be no black border when the video in the landscape format is played in the portrait mode.

The receiver 230 is an example of the receiver 170B shown in FIG. 1. The receiver 230 is a component that can convert an audio electrical signal into a sound signal when there is no sound leakage, and is usually used to answer a call, listen to a voice message, or the like. When the receiver 230 is used to play a sound, generally, only the user can hear the sound. This case may also be referred to as that a terminal device is in a receiver mode. The receiver 230 is usually disposed on an upper part of the electronic device 200, for example, a front top, and is placed near a human ear in use. For ease of understanding, in this embodiment of this application, two ends of the electronic device in a length direction are referred to as an upper part (top) and a lower part (bottom), two ends in a width direction are referred to as a left part and a right part, and a surface in a thickness direction is referred to as a side surface.

The speaker 240 is an example of the speaker 170A shown in FIG. 1. The speaker 240 is a transducer component that converts an electrical signal into a sound signal, can transmit the sound far away, and may be usually used for hands-free calling, music play, play of audio in a video, and the like. When the speaker 240 is used to play a sound, the sound can be transmitted far away and can be heard by another person. This case may also be referred to as that the terminal device is in a speaker mode. The speaker 240 is usually disposed at the bottom of the electronic device 200, and a sound-emitting hole of the speaker 240 is located on a side surface of the electronic device 200. Alternatively, the speaker 240 is disposed at a middle position of the electronic device 200, and a sound-emitting hole of the speaker 240 is located on the back surface of the electronic device 200.

Specific structures of the receiver 230 and the speaker 240 are similar, and both generate vibration by using acting forces of a voice coil and a magnet, to drive a vibrating diagram to vibrate and produce a sound. In embodiments of this application, the receiver 230 and the speaker 240 may be collectively referred to as a sound-emitting unit.

Figure 4:
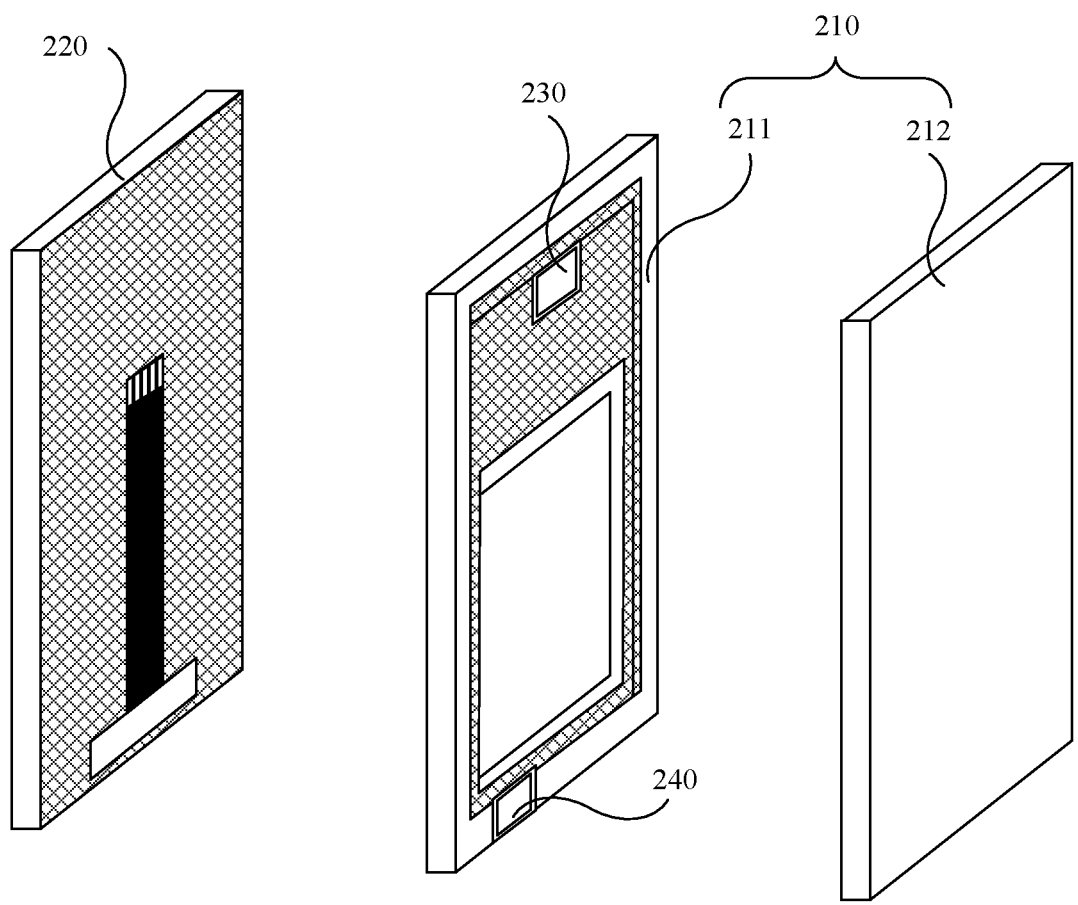
FIG. 4 is a schematic exploded view of an existing electronic device.

FIG. 4 is a schematic exploded view of the electronic device 200 in FIG. 3. As shown in FIG. 4, the housing 210 includes a middle frame 211 and a rear cover 212, and the middle frame 211 is located between the display 220 and the rear cover 212. The receiver 230 and the speaker 240 may be fixed to the middle frame 211. A sound guide channel (not shown in the figure) for guiding a sound out of the electronic device 200 is disposed on the middle frame 211 and/or the rear cover 212. Other components such as a printed circuit board (printed circuit board, PCB) and a central processing unit (central processing unit, CPU) may be further disposed on the middle frame 211, and are not shown and described one by one herein.

As shown in FIG. 3 and FIG. 4, a speaker mode used by the electronic device 200 is an up-down type, that is, a sound-emitting unit is separately disposed on the upper part and the lower part of the electronic device 200 (namely, the top and the bottom of the electronic device 200). In this way, when the electronic device 200 is used horizontally, the receiver 230 at the upper part is on a same side as a left ear of a person, and can play content in a left sound channel, and the speaker 240 at the lower part is on a same side as a right ear of the person, and can play content in a right sound channel. Therefore, when the electronic device 200 is used horizontally, left and right stereo output can be implemented. However, in this up-down speaker mode, stereo play can be implemented in only a landscape-mode play scenario. In a portrait-mode play scenario, because neither of the receiver 230 and the speaker 240 distinguishes between the left sound channel and the right sound channel, played sound content is the same, or only the speaker 240 emits a sound, and consequently, stereo play cannot be implemented. Currently, more and more users use short video and live broadcast applications, and short video platforms and live broadcast platforms use a portrait format to improve a sense of communication and immersion. Therefore, there are more and more portrait-mode play scenarios, and the user also has a requirement for improving sound quality in the portrait-mode play scenario.

An embodiment of this application provides a terminal device, which can implement stereo output in a landscape-mode play scenario and a portrait-mode play scenario, to resolve a problem that there is no stereo in the portrait-mode play scenario currently, and improve user experience.

Figure 5:
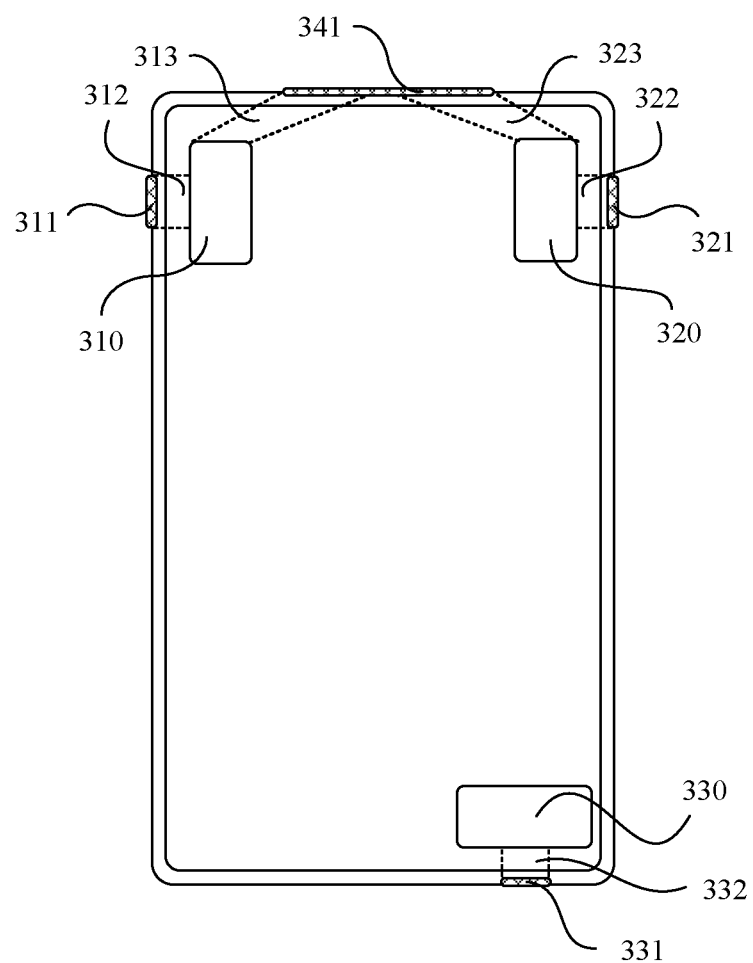
FIG. 5 is a schematic diagram of a structure of a terminal device according to an embodiment of this application.

FIG. 5 is a schematic diagram of a structure of a terminal device according to an embodiment of this application. FIG. 5 is a front top view of the terminal device. As shown in FIG. 5, the terminal device 300 includes a first sound-emitting unit 310, a second sound-emitting unit 320, and a third sound-emitting unit 330. The first sound-emitting unit 310 and the second sound-emitting unit 320 are arranged in a width direction of the terminal device 300, and are located at one end of the terminal device 300 in a length direction. The third sound-emitting unit 330 is located at the other end of the terminal device 300 in the length direction. For example, in FIG. 5, the terminal device 300 is vertically placed, the length direction of the terminal device 300 is an up-down direction of paper, and the width direction is a left-right direction of the paper. The first sound-emitting unit 310 and the second sound-emitting unit 320 are respectively disposed on a left side and a right side of the terminal device 300, and are close to the top of the terminal device 300. For example, the first sound-emitting unit 310 is located at an upper left corner of the terminal device 300, and the second sound-emitting unit 320 is located at an upper right corner of the terminal device 300. The third sound-emitting unit 330 is disposed at the bottom of the terminal device 300, for example, at a lower left corner, a lower right corner, or a middle bottom of the terminal device 300.

The first sound-emitting unit 310, the second sound-emitting unit 320, and the third sound-emitting unit 330 may be the same, or may be different. This is not specifically limited in this embodiment of this application. For example, the first sound-emitting unit 310, the second sound-emitting unit 320, and the third sound-emitting unit 330 are all speakers; or the first sound-emitting unit 310 and the second sound-emitting unit 320 are receivers, and the third sound-emitting unit 330 is a speaker. It should be understood that locations of the first sound-emitting unit 310, the second sound-emitting unit 320, and the third sound-emitting unit 330 in the figure are merely an example. Preferably, the first sound-emitting unit 310 and the second sound-emitting unit 320 are at a same distance from the top of the terminal device 300, that is, the first sound-emitting unit 310 and the second sound-emitting unit 320 are leveled with each other in the width direction of the terminal device 300.

A left sound-emitting hole 311, a right sound-emitting hole 321, a lower sound-emitting hole 331, and an upper sound-emitting hole 341 are respectively disposed on four sides of the terminal device 300. The left sound-emitting hole 311 and the right sound-emitting hole 321 are respectively disposed on the two sides of the terminal device 300 in the length direction. The left sound-emitting hole 311 is located on the left side of the terminal device 300, and the right sound-emitting hole 321 is located on the right side of the terminal device 300. The lower sound-emitting hole 331 and the upper sound-emitting hole 341 are respectively disposed on the two sides of the terminal device 300 in the width direction. The lower sound-emitting hole 331 is located on a lower side of the terminal device 300, and the upper sound-emitting hole 341 is located on an upper side of the terminal device 300. For example, in FIG. 5, the terminal device 300 is vertically placed, the left sound-emitting hole 311 and the right sound-emitting hole 321 are respectively disposed on the left side and the right side of the terminal device 300, and the upper sound-emitting hole 341 and the lower sound-emitting hole 331 are respectively disposed on the upper side and the lower side of the terminal device 300. It should be understood that in this embodiment of this application, a quantity of left sound-emitting holes is not limited to one, and all sound-emitting holes disposed on the left side of the terminal device are referred to as left sound-emitting holes. The right sound-emitting hole, the lower sound-emitting hole, and the upper sound-emitting hole are similar, and details are not described again.

A sound-emitting hole of the terminal device 300 may be disposed on a front edge of the terminal device 300, a side face of the terminal device 300, or a rear edge of the terminal device 300. A location, a size, and the like of the sound-emitting hole in the figure are merely used as an example. Preferably, the left sound-emitting hole 311 and the right sound-emitting hole 321 are at a same distance from the top of the terminal device 300, that is, the left sound-emitting hole 311 and the right sound-emitting hole 321 are leveled with each other in the width direction of the terminal device 300.

A left sound guide channel 312 is disposed between the first sound-emitting unit 310 and the left sound-emitting hole 311, and a first upper sound guide channel 313 is disposed between the first sound-emitting unit 310 and the upper sound-emitting hole 341. A right sound guide channel 322 is disposed between the second sound-emitting unit 320 and the right sound-emitting hole 321, and a second upper sound guide channel 323 is disposed between the second sound-emitting unit 320 and the upper sound-emitting hole 341. A lower sound guide channel 332 is disposed between the third sound-emitting unit 330 and the lower sound-emitting hole 331. It can be seen from FIG. 5 that, the first sound-emitting unit 310 is connected, through the left sound guide channel 312 and the first upper sound guide channel 313, to sound-emitting holes on the left side and the upper side of the terminal device 300 separately, namely, the left sound-emitting hole 311 and the upper sound-emitting hole 341. The second sound-emitting unit 320 is connected, through the right sound guide channel 322 and the second upper sound guide channel 323, to sound-emitting holes on the right side and the upper side of the terminal device 300 separately, namely, the right sound-emitting hole 321 and the upper sound-emitting hole 341. The third sound-emitting unit 330 is connected, through the lower sound guide channel 332, to a sound-emitting hole on the lower side of the terminal device 300, namely, the lower sound-emitting hole 331. In other words, the first sound-emitting unit 310 may emit a sound from the left side and/or the upper side of the terminal device 300, and the second sound-emitting unit 320 may emit a sound from the right side and/or the upper side of the terminal device 300. In this embodiment of this application, both the first upper sound guide channel 313 and the second upper sound guide channel 323 guide a sound to the upper sound-emitting hole 341. Therefore, in some embodiments, the first upper sound guide channel 313 and the second upper sound guide channel 323 may be collectively referred to as an upper sound guide channel. In short, in this embodiment of this application, an upper sound guide channel is used to guide a sound in an upward direction of the terminal device, a lower sound guide channel is used to guide the sound in a downward direction of the terminal device, a left sound guide channel is used to guide the sound in a leftward direction of the terminal device, and a right sound guide channel is used to guide the sound in a rightward direction of the terminal device. It should be understood that in this embodiment of this application, a quantity of left sound guide channels is not limited to one, and all sound guide channels used to guide the sound in the leftward direction of the terminal device are referred to as left sound guide channels. The upper sound guide channel, the right sound guide channel, and the lower sound guide channel are similar, and details are not described again.

It should be understood that a shape and a location of a sound guide channel in the figure are merely examples. During actual application, the sound guide channel may be formed by a sound guide unit, or may be enclosed by a sound guide unit and another component in the terminal device. This is not specifically limited in this embodiment of this application.

In this embodiment of this application, the first sound-emitting unit 310/the second sound-emitting unit 320 are respectively connected to two sound-emitting holes through two sound guide channels, and either of the two sound guide channels may be in an open state or a closed state. When the first sound-emitting unit 310/the second sound-emitting unit 320 works, a sound is controlled to be emitted from at least one of the two sound-emitting holes. The following provides description with reference to a usage scenario of the terminal device.

It should be noted that, when the first sound-emitting unit 310/the second sound-emitting unit 320 works, the two sound guide channels are both closed, so that neither of the two sound-emitting holes emits a sound. This case has no actual application significance, and is not described in detail in this application. In this case, the first sound-emitting unit 310/the second sound-emitting unit 320 may not be driven to work, and no sound is emitted from the two sound-emitting holes regardless of whether the sound guide channel is opened or closed. It should be understood that whether the sound guide channel guides a sound and whether the sound-emitting hole emits a sound are related to whether the sound-emitting unit works. In this embodiment of this application, whether the sound guide channel is opened or closed is described in a case in which the corresponding sound-emitting unit works. In addition, unless otherwise specified, if whether a sound-emitting unit plays a sound is not described, it may be considered that the sound-emitting unit does not work. When a specific sound-emitting unit has only one sound guide channel, if the sound-emitting unit works, it indicates that a corresponding sound guide channel is opened; or if the sound-emitting unit does not work, it indicates that a corresponding sound guide channel is closed.

Figure 6:
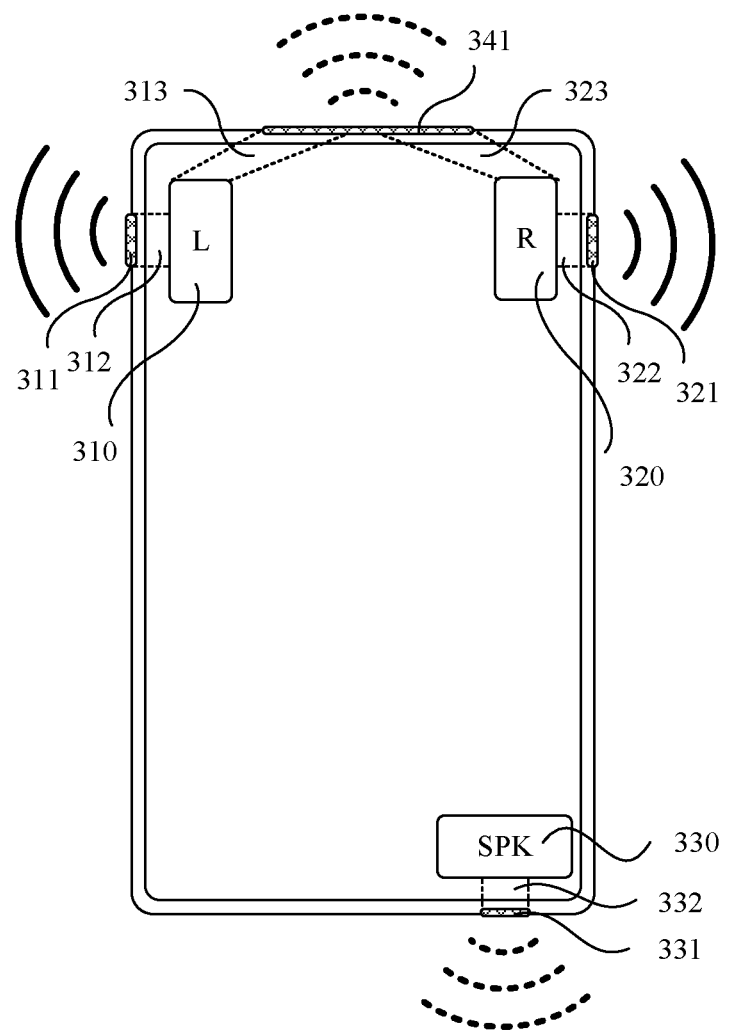
FIG. 6 is a schematic diagram of sound emitting of a sound-emitting unit in a portrait-mode audio/video play scenario.

FIG. 6 is a schematic diagram of sound emitting of a sound-emitting unit in a portrait-mode audio/video play scenario. In this embodiment of this application, in the portrait-mode audio/video play scenario, it may be considered that the terminal device is in portrait and speaker modes. As shown in FIG. 6, when a user vertically uses the terminal device to perform audio/video play, a first sound-emitting unit 310 plays a left sound channel, and a second sound-emitting unit 320 plays a right sound channel.

In an implementation, a left sound guide channel 312 and a right sound guide channel 322 are in an open state, and a first upper sound guide channel 313 and a second upper sound guide channel 323 are in a closed state. In this way, the first sound-emitting unit 310 and the second sound-emitting unit 320 respectively play the left sound channel and the right sound channel, and a sound is emitted from a left sound-emitting hole and a right sound-emitting hole through the left sound guide channel and the right sound guide channel. When the user vertically uses the terminal device to play audio or a video, stereo output can be implemented. This improves user experience. To be specific, when the terminal device is used to play stereo in a portrait mode, the terminal device (which may be specifically a processing unit of the terminal device) controls the first sound-emitting unit 310 and the second sound-emitting unit 320 to play sound channels on different sides (for example, the left sound channel and the right sound channel), the left sound guide channel and the right sound guide channel are opened, the first upper sound guide channel 313 and the second upper sound guide channel 323 are closed, the first sound-emitting unit 310 emits a sound from only the left sound-emitting hole 311, and the second sound-emitting unit 320 emits a sound from only the right sound-emitting hole 321. In this way, neither of the left sound channel and the right sound channel emits a sound from an upper sound-emitting hole 341, which can prevent crosstalk between the left sound channel and the right sound channel. In another implementation, a left sound guide channel 312 and a right sound guide channel 322 are in an open state, and a first upper sound guide channel 313 and a second upper sound guide channel 323 are in an open state. In this way, the first sound-emitting unit 310 and the second sound-emitting unit 320 respectively play the left sound channel and the right sound channel, and a sound is emitted from a left sound-emitting hole and a right sound-emitting hole through the left sound guide channel and the right sound guide channel. In addition, the left sound channel and the right sound channel are aggregated through the first upper sound guide channel 313 and the second upper sound guide channel 323, and a sound is emitted from an upper sound-emitting hole 341. When the user vertically uses the terminal device to play audio or a video, stereo output can be implemented. This improves user experience. The first upper sound guide channel 313 and the second upper sound guide channel 323 respectively guide the left sound channel and the right sound channel, and the left sound channel and the right sound channel are aggregated in the upper sound-emitting hole 341, so that an effect of mixed output of the left sound channel and the right sound channel can be achieved.

In short, when the terminal device is used to play the stereo in the portrait mode, the terminal device (which may be specifically a processing unit of the terminal device) may control the first sound-emitting unit 310 and the second sound-emitting unit 320 to play the sound channels on different sides (for example, the left sound channel and the right sound channel), and emit a sound from the left sound-emitting hole 311 and the right sound-emitting hole 321.

Optionally, when the first sound-emitting unit 310 plays the left sound channel, and the second sound-emitting unit 320 plays the right sound channel, the third sound-emitting unit 330 may play a sound, or may not play a sound. When the third sound-emitting unit 330 plays the sound, sound field and bass enhancement may be performed. For example, the third sound-emitting unit 330 may play a bass sound channel to improve a sense of shock, or play a center sound channel to enhance energy intensity and saturation of human voice dialog, so that the left and right sound channels are smoothly connected. When the third sound-emitting unit 330 does not play the sound, certainly no sound is emitted through a lower sound guide channel 332, so that power consumption of the terminal can be reduced.

Figure 7:
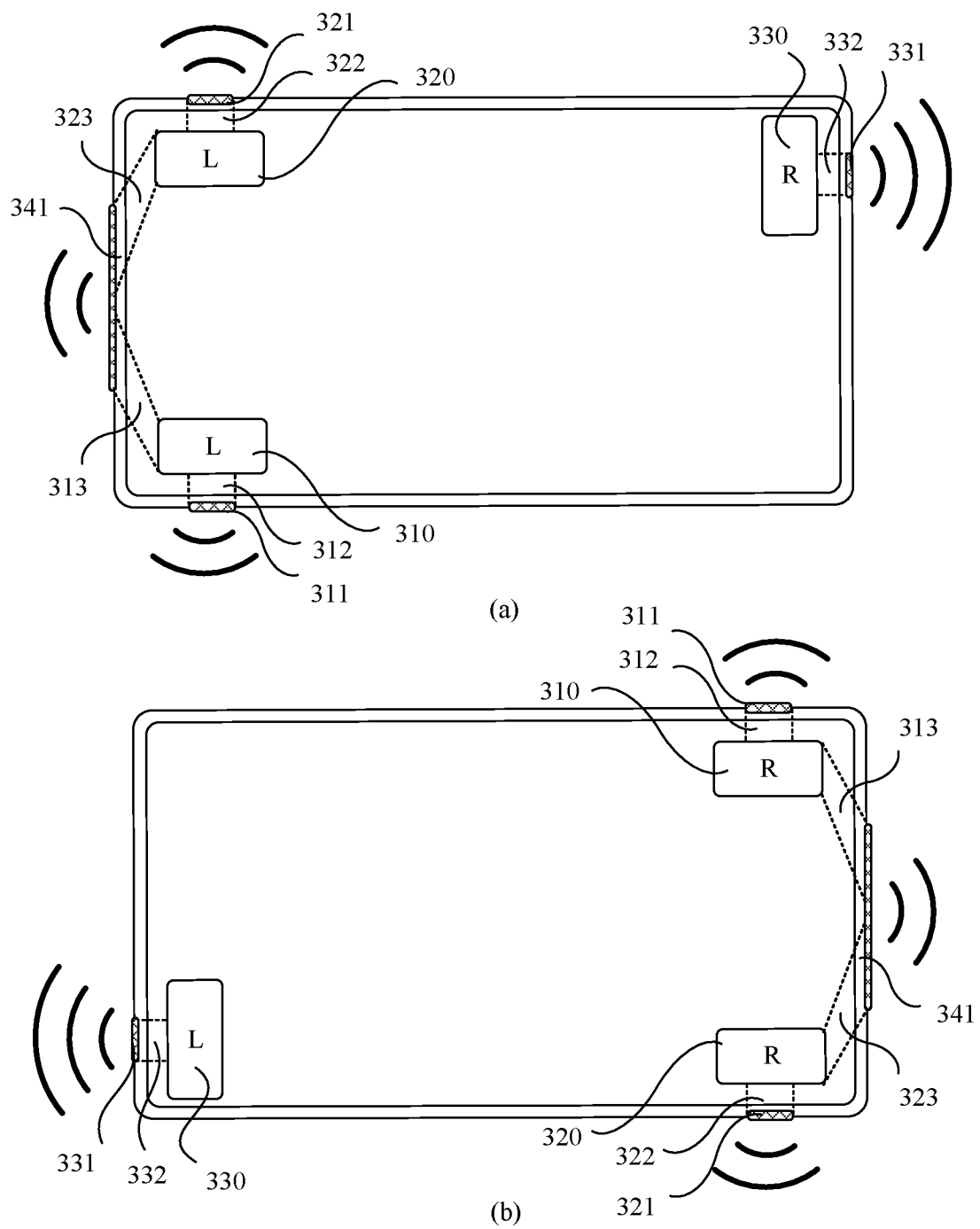
FIG. 7 is a schematic diagram of sound emitting of a sound-emitting unit in a landscape-mode audio/video play scenario.

FIG. 7 is a schematic diagram of sound emitting of a sound-emitting unit in a landscape-mode audio/video play scenario. In this embodiment of this application, in the landscape-mode audio/video play scenario, it may be considered that a terminal device is in landscape and speaker modes. As shown in FIG. 7, when a user horizontally uses the terminal device to perform audio/video play, a first sound-emitting unit 310 and a second sound-emitting unit 320 play a sound channel on one side in dual sound channels, and a third sound-emitting unit 330 plays a sound channel on the other side in the dual sound channels. As shown in (a) in FIG. 7, when the top of the terminal device rotates leftward and is disposed horizontally, the first sound-emitting unit 310 and the second sound-emitting unit 320 play a left sound channel, and the third sound-emitting unit 330 plays a right sound channel. Alternatively, as shown in (b) in FIG. 7, when the top of the terminal device rotates rightward and is disposed horizontally, the first sound-emitting unit 310 and the second sound-emitting unit 320 play a right sound channel, and the third sound-emitting unit 330 plays a left sound channel. In this way, it can be ensured that, regardless of a specific direction in which the top of the terminal device rotates, a sound-emitting unit on a same side as a left ear of the user can play the left sound channel, and a sound-emitting unit on a same side as a right ear of the user can play the right sound channel, to implement stereo output in the landscape-mode audio/video play scenario. The following describes a sound emitting situation of the sound-emitting unit by using a case shown in (a) in FIG. 7 as an example.

In a possible implementation, either of the first sound-emitting unit 310 and the second sound-emitting unit 320 plays the left sound channel, and at least one of two sound guide channels connected to the sound-emitting unit is in an open state to guide content of the left sound channel. The third sound-emitting unit 330 plays the right sound channel, and a lower sound guide channel 332 guides content of the right sound channel. For example, the first sound-emitting unit 310 plays the left sound channel. At least one of a left sound guide channel 312 or a first upper sound guide channel 313 is in an open state, and is used to guide the content from the left sound channel. Selecting one of the first sound-emitting unit 310 and the second sound-emitting unit 320 to play a sound channel not only can implement stereo, but also can reduce power consumption of the terminal device.

In another possible implementation, both the first sound-emitting unit 310 and the second sound-emitting unit 320 are configured to play the left sound channel, and at least one of two sound guide channels connected to each sound-emitting unit is in an open state, that is, at least one of a left sound guide channel 312 and a first upper sound guide channel 313 guides content of the left sound channel to the outside of the terminal device, and at least one of a right sound guide channel 322 and a second upper sound guide channel 323 guides the content of the left sound channel to the outside of the terminal device. Specifically, a quantity of sound guide channels to be opened may be determined based on volume of the sound-emitting unit. For example, the left sound guide channel 312 and the right sound guide channel 322 are in an open state, and the first upper sound guide channel 313 and the second upper sound guide channel 323 are also in an open state. In this case, the first sound-emitting unit 310 and the second sound-emitting unit 320 play the left sound channel, and play the content of the left sound channel from a left sound-emitting hole 311, a right sound-emitting hole 321, and an upper sound-emitting hole 341. The third sound-emitting unit 330 plays the right sound channel, and plays the content of the right sound channel from a lower sound-emitting hole 331. When the user horizontally uses the terminal device to play audio/a video, all the three sound-emitting units work, and all the four sound-emitting holes emit a sound. The three sound-emitting holes at the top of the terminal device are simultaneously configured to play a single-side sound channel, for example, the left sound channel, and the sound-emitting hole at the bottom of the terminal device plays another single-side sound channel, for example, the right sound channel. In this way, stereo output can be implemented, and user experience can be improved.

Preferably, when the terminal device is configured to play stereo in a landscape mode, a sound played by the first sound-emitting unit 310 and/or the second sound-emitting unit 320 is emitted through only the upper sound-emitting hole, and a sound played by the third sound-emitting unit 330 is emitted through the lower sound-emitting hole, so that a stereo effect is better.

In short, when the terminal device is configured to play stereo in the landscape mode, the terminal device (which may be specifically a processing unit of the terminal device) may control the first sound-emitting unit 310 and/or the second sound-emitting unit 320 to play a sound channel on one side and emit a sound from at least one of the left sound-emitting hole 311, the right sound-emitting hole 321, and the upper sound-emitting hole 341, and the terminal device controls the third sound-emitting unit 330 to play a sound channel on another side.

Because there may be a difference between sound-emitting units, when stereo is played, a balanced stereo effect may be achieved through volume compensation, audio parameter compensation, and the like.

Figure 8:
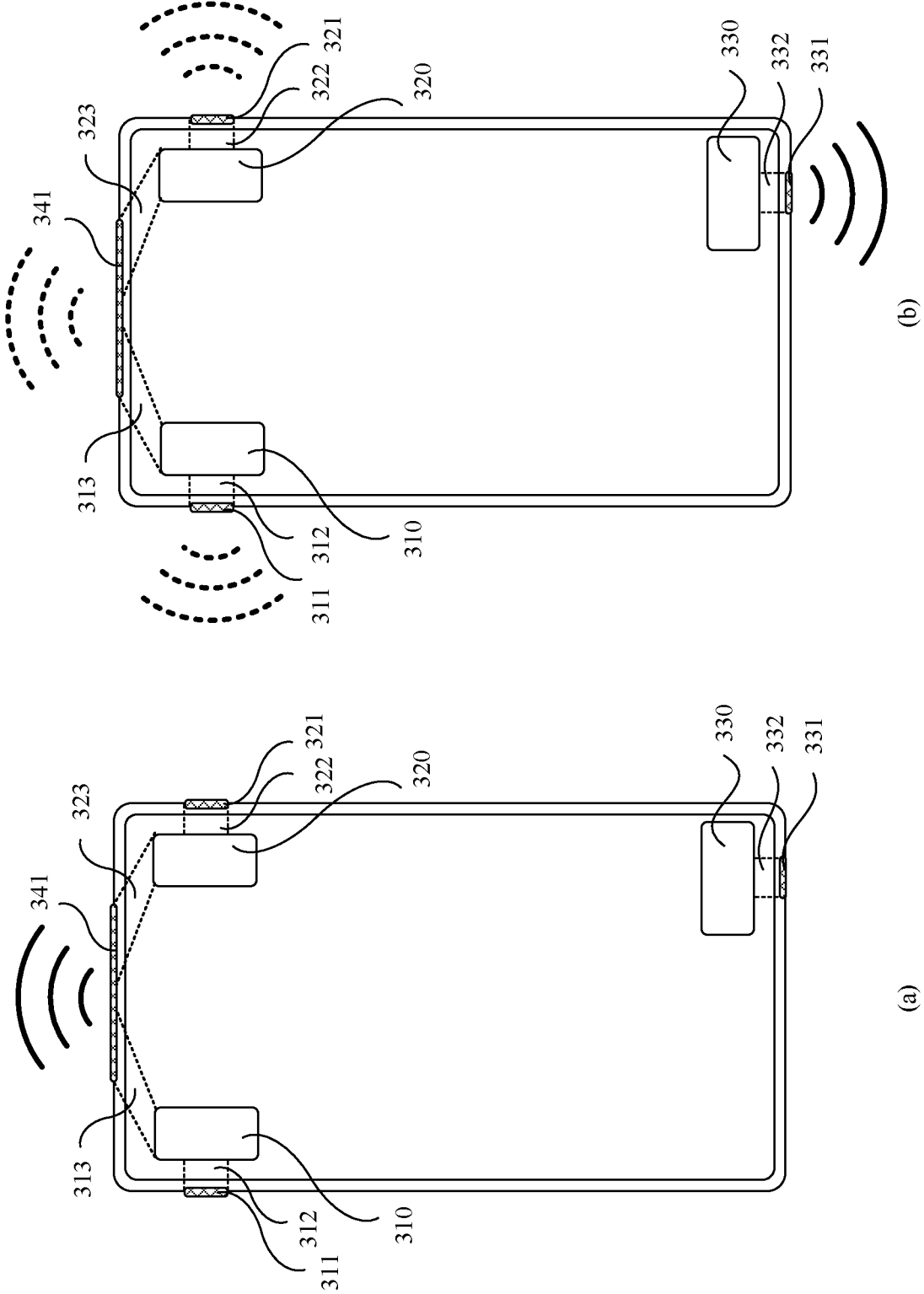
FIG. 8 is a schematic diagram of sound emitting of a sound-emitting unit in a portrait-mode call scenario.

In addition to audio/video play, the terminal device is mainly used for communication. When the terminal device is used for communication, a voice in a communication process is a mono sound channel. Therefore, the sound-emitting unit plays the mono sound channel, and content of sounds played by the plurality of sound-emitting units is the same. In this embodiment of this application, when the terminal device is used for a call, the terminal device (which may be specifically a processing unit of the terminal device) may control a playing manner of the sound-emitting unit based on a call mode. The call mode includes a receiver mode and a speaker mode. FIG. 8 shows a schematic diagram of sound emitting of a sound-emitting unit in a portrait-mode call scenario.

(a) in FIG. 8 shows a portrait-mode call scenario. In this scenario, only an upper sound-emitting hole 341 emits a sound, and none of other sound-emitting holes emits a sound. It may be considered that a terminal device is in a receiver mode, to ensure privacy of call content.

In a possible implementation, either of a first sound-emitting unit 310 and a second sound-emitting unit 320 works, and a third sound-emitting unit 330 does not work. In an example in which the first sound-emitting unit 310 works, a left sound guide channel 312 is in a closed state, and a first upper sound guide channel 313 is in an open state. In this way, only the upper sound-emitting hole 341 emits a sound. Because the second sound-emitting unit 320 does not work, a right sound guide channel 322 and a second upper sound guide channel 323 may be in an open state, or may be in a closed state.

In another possible implementation, a first sound-emitting unit 310 and a second sound-emitting unit 320 work, and a third sound-emitting unit 330 does not work. A left sound guide channel 312 and a right sound guide channel 322 are in a closed state, and a first upper sound guide channel 313 and a second upper sound guide channel 323 are in an open state. In this way, a sound emitted by the first sound-emitting unit 310 and a sound the second sound-emitting unit 320 are transmitted through an upper sound guide channel, and then are emitted from only the upper sound-emitting hole 341.

In short, when the terminal device is in the receiver mode, the terminal device (which may be specifically a processing unit of the terminal device) may control the first sound-emitting unit 310 and/or the second sound-emitting unit 320 to play a mono voice, and emit a sound from only the upper sound-emitting hole 341.

(b) in FIG. 8 shows a portrait-mode video call scenario, which is similar to a portrait-mode audio/video play scenario. In this scenario, at least one of three sound-emitting units works, and is configured to play voice content in a video call process. As shown in the figure, for example, a first sound-emitting unit 310 and a second sound-emitting unit 320 may work, and correspondingly, at least one of a left sound guide channel 312, a right sound guide channel 322, a first upper sound guide channel 313, and a second upper sound guide channel 323 is in an open state. For another example, only a third sound-emitting unit 330 may work, and correspondingly, a lower sound guide channel 332 guide a sound to the outside of the terminal device. In this way, only the lower sound-emitting hole 331 emits a sound, and none of other sound-emitting holes emits a sound. When the terminal device is in a speaker mode, for example, a hands-free mode or a voice call mode, a sound emitting situation of the sound-emitting unit is the same as that in the foregoing portrait-mode video call scenario, and details are not described again.

In short, when the terminal is set to be in the speaker mode, the terminal device (which may be specifically a processing unit of the terminal device) may control at least one of the first sound-emitting unit 310, the second sound-emitting unit 320, and the third sound-emitting unit 330 to play the mono voice.

Optionally, when the terminal is used for a call in the speaker mode, a plurality of sound-emitting units of the first sound-emitting unit 310, the second sound-emitting unit 320, and the third sound-emitting unit 330 may play a voice. In this way, when a specific sound-emitting unit is blocked by an obstruction, another sound-emitting unit may also emit a sound.

Optionally, a sound-emitting unit used to emit a sound in the speaker mode may be customized or selected by a user. In this way, when a specific sound-emitting unit is damaged, another sound-emitting unit may also be used to emit a sound.

Each of the left sound guide channel 312, the right sound guide channel 322, the first upper sound guide channel 313, and the second upper sound guide channel 323 has two states: an open state and a closed state. In some other embodiments, the first upper sound guide channel 313 and the second upper sound guide channel 323 may be in a normally open state. In this way, regardless of a usage status of the terminal device, as long as the first sound-emitting unit 310 and/or the second sound-emitting unit 320 play a sound, the upper sound-emitting hole 341 emits a sound. An open/closed state of another sound guide channel is the same as that described above. For brevity, details are not described again.

Figure 9:
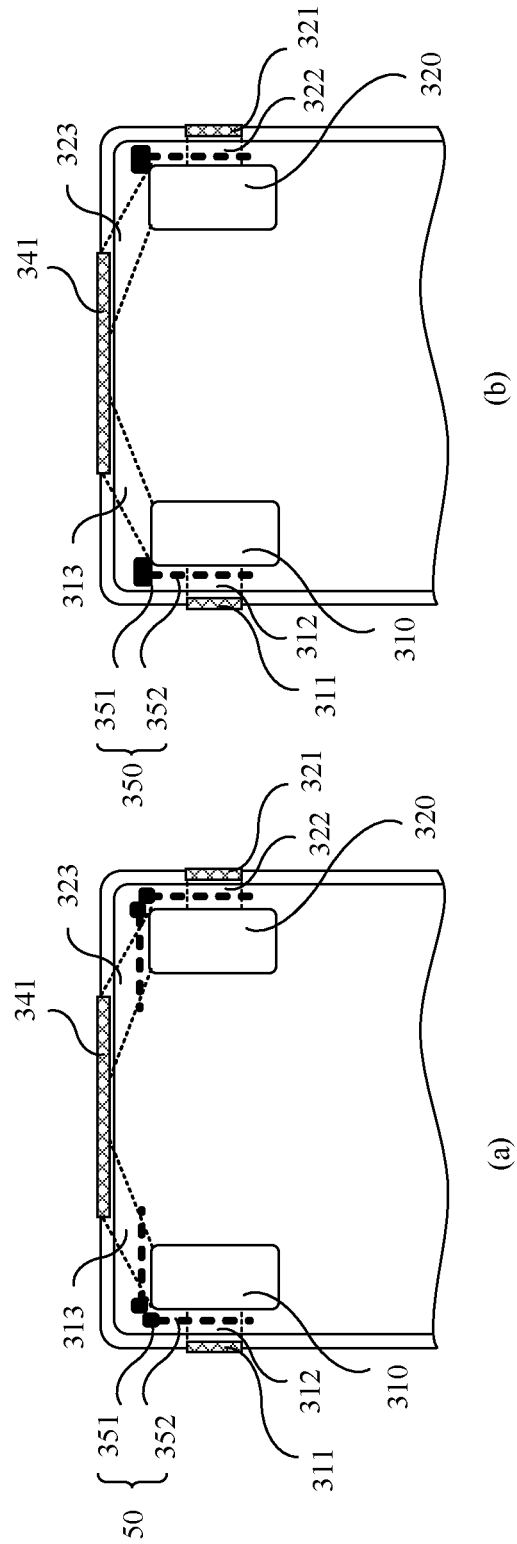
FIG. 9 is a schematic diagram of a control component according to an embodiment of this application.

To control an open/closed state of a sound guide channel, a terminal device in this embodiment of this application further includes control components. The control component is configured to control an open/closed state of the sound guide channel between a sound-emitting unit and a sound-emitting hole. FIG. 9 is a schematic diagram of a control component according to an embodiment of this application. As shown in (a) in FIG. 9, the control components 350 may be disposed on all sound guide channels that connect a first sound-emitting unit 310 and a second sound-emitting unit 320 to the outside of a terminal. To be specific, the control component 350 is configured on each of a left sound guide channel 312, a right sound guide channel 322, a first upper sound guide channel 313, and a second upper sound guide channel 323. In some embodiments, as shown in (b) in FIG. 9, the control components 350 may alternatively be disposed on a sound guide channel between a first sound-emitting unit 310 and a left sound-emitting hole 311 and a sound guide channel between a second sound-emitting unit 320 and a right sound-emitting hole 321. To be specific, the control components 350 are configured on only a left sound guide channel 312 and a right sound guide channel 322, and a first upper sound guide channel 313 and a second upper sound guide channel 323 may be in a normally open state. The control component 350 includes a signal receiving module 351 and a movable part 352. The signal receiving module 351 may receive an instruction delivered by a central processing unit or the like, to control motion of the movable part 352, so as to open or close the sound guide channel. A form of the instruction received by the signal receiving module 351 may be power-on or power-off, a high level or a low level, a binary instruction "1" or "0", or the like, to control corresponding motion of the movable part. Optionally, the control component 350 may include a magnetic-attraction power-on unit/module. A power-on or power-off state of the magnetic-attraction power-on module may control the movable part 352 to close or open the sound guide channel. A value of a current in the magnetic-attraction power-on module may control a degree of opening the sound guide channel by the movable part 352, to control volume of a sound emitted from the sound-emitting hole.

Figure 10:
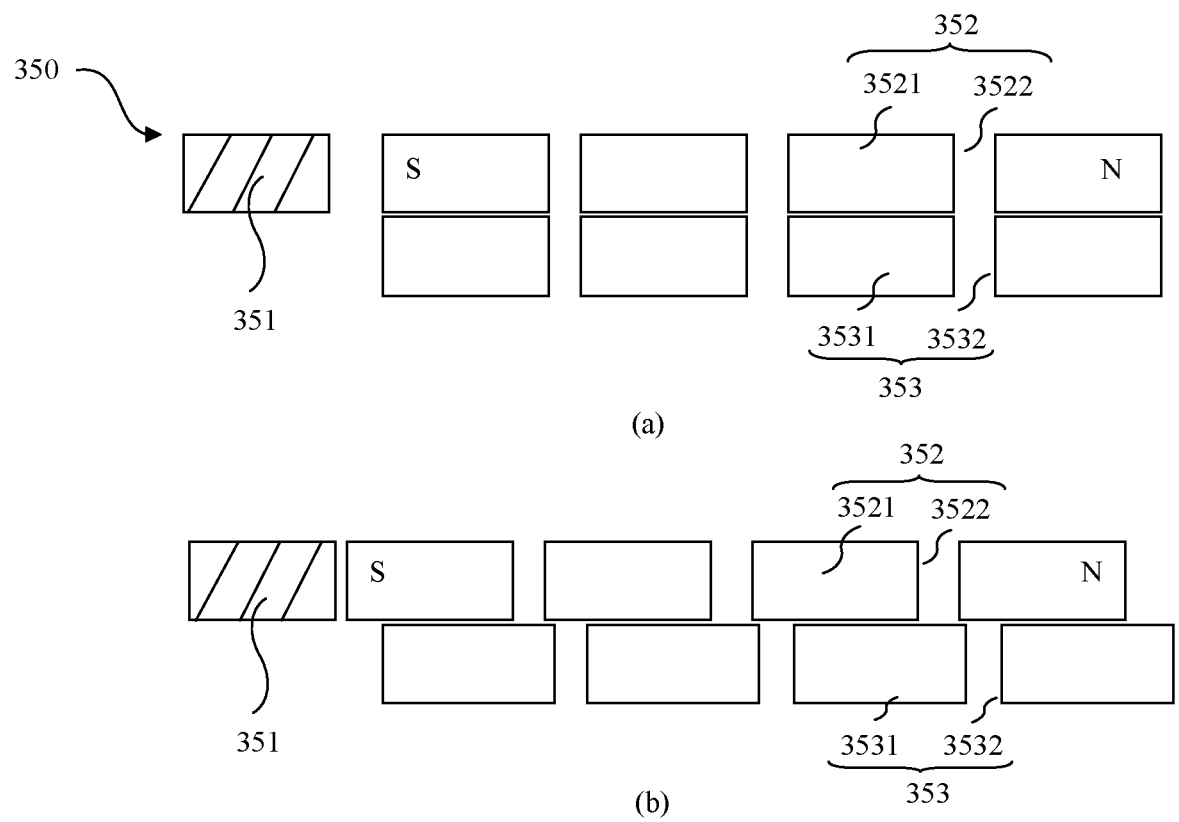
FIG. 10 is a schematic diagram of a structure of a control component according to an embodiment of this application.

FIG. 10 is a schematic diagram of a structure of a control component according to an embodiment of this application. As shown in FIG. 10, the control component 350 includes a signal receiving module 351, a movable part 352, and a fixed part 353, and the control component 350 is a magnetic-attraction power-on module. The signal receiving module 351 is configured to receive a control signal (for example, an electrical signal). The signal receiving module 351 includes a coil, and the coil can generate a magnetic field after being powered on. The movable part 352 may be a magnetic magnet. In this way, after the coil is powered on, the movable part 352 can generate relative motion under the action of the magnetic field. The movable part 352 includes a movable part body 3521 and a movable through hole 3522 disposed on the movable part body 3521. The fixed part 353 is fixed relative to the movable part 352, and the fixed part 353 includes a fixed part body 3531 and a fixed through hole 3532 disposed on the fixed part body 3531. After the coil is powered on, the control module 351 and the movable part 352 generate acting forces that repel or attract each other, so that the movable part 352 and the fixed part 353 move relative to each other, and the fixed through hole 3532 and the movable through hole 3522 are connected to each other or staggered with each other, to open or close a sound guide channel. For example, as shown in (a) in FIG. 10, it is assumed that, when the coil is not powered on, the movable part 352 is located at an initial position, and the movable through hole 3522 is connected to the fixed through hole 3532. In this way, a sound emitted by a sound-emitting unit may be guided to the outside through the movable through hole 3522 and the fixed through hole 3532. As shown in (b) in FIG. 10, when the coil is powered on, the movable part 352 moves relative to the fixed part 353, the movable through hole 3522 and the fixed through hole 3532 are staggered with each other, the movable through hole 3522 is blocked by the fixed part body 3531, and the fixed through hole 3532 is blocked by the movable part body 3521. In this way, a sound emitted by a sound-emitting unit cannot be guided to the outside through the movable through hole 3522 and the fixed through hole 3532, and then cannot be guided to the outside through the sound guide channel. In addition, a magnitude of a current flowing into the coil may control a magnitude of a magnetic field generated by the coil, to control a relative motion distance between the movable part 352 and the fixed part 353 and control an area in which the movable part through hole is connected to or staggered with the fixed part through hole. In this way, the control component 350 may also adjust volume of a sound-emitting hole.

A power-on/power-off state of the magnetic-attraction power-on module may be controlled by using a diode, a triode, a high/low level, or the like. During actual application, a person skilled in the art may perform a corresponding design based on a requirement. This is not specifically limited in this embodiment of this application.

It should be understood that, in some other embodiments, the control component 350 may alternatively control opening and closing of the sound guide channel in another manner. For example, a bendable part is disposed on the sound guide channel, the sound guide channel is closed when the bendable part is at a specific angle, for example, 90 degrees, and the sound guide channel is opened when the bendable part is opened. For another example, a lifting component is disposed on the sound guide channel, the sound guide channel is opened when the lifting component lifts up, and the sound guide channel is closed when the lifting component lifts down. A person skilled in the art may design a corresponding control component based on a specific requirement, and details are not described herein again.

The terminal device provided in this embodiment of this application includes three sound-emitting units. The two sound-emitting units at the top of the terminal can replace an original receiver to implement portrait-mode stereo, and can further implement landscape-mode stereo with the sound-emitting units at the bottom when the terminal device is used in a landscape mode. Compared with an existing terminal device, the terminal device according to this embodiment of this application is additionally provided with only one sound-emitting unit, to resolve, on the premise of utilizing space as efficiently as possible, a problem that there is no stereo during portrait-mode play of the terminal device, and implement stereo output during both landscape-mode play and the portrait-mode play. Further, in this embodiment of this application, opening and closing of the sound guide channel are controlled by using the control component, and different sound emitting solutions are provided based on different usage scenarios of a user, so that audio play requirements in various scenarios can be met.

Figure 11:
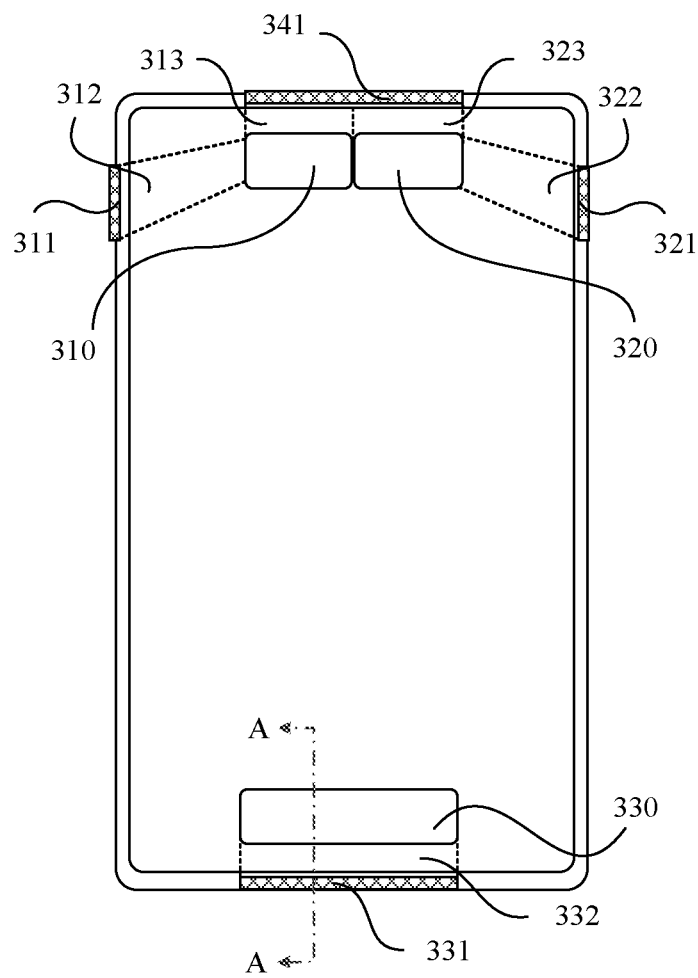
FIG. 11 is a schematic diagram of a structure of another terminal device according to an embodiment of this application.

FIG. 11 is a schematic diagram of a structure of another terminal device according to an embodiment of this application. Different from that in the terminal device 300 shown in FIG. 5, in the terminal device 400 shown in FIG. 11, a first sound-emitting unit 310 and a second sound-emitting unit 320 are disposed at a middle top position of the terminal device. Same as that in the terminal device 300, the first sound-emitting unit 310 is connected to the outside by using a left sound guide channel 312 and a left sound-emitting hole 311, and may guide a sound to the outside from a left side of the terminal device. The second sound-emitting unit 320 is connected to the outside by using a right sound guide channel 322 and a right sound-emitting hole 321, and may guide a sound to the outside from a right side of the terminal device. The first sound-emitting unit 310 and the second sound-emitting unit 320 may guide a sound from an upper side of the terminal device by using a first upper sound guide channel 313 and a second upper sound guide channel 323 respectively. There may be a spacing between the first upper sound guide channel 313 and the second upper sound guide channel 323, or there may be no spacing between the first upper sound guide channel 313 and the second upper sound guide channel 323. A third sound-emitting unit 330 may be disposed at any position of the bottom of the terminal device, for example, a bottom corner shown in FIG. 5 or a bottom middle position shown in FIG. 11. For other descriptions, refer to related descriptions of the terminal device 300. Details are not described herein again. It should be understood that the first sound-emitting unit 310, the second sound-emitting unit 320, and the third sound-emitting unit 330 in this embodiment of this application may be disposed at any location of the terminal, provided that the three sound-emitting units can be connected to corresponding sound-emitting holes.

In this embodiment of this application, the sound-emitting hole may be disposed on a front surface of the terminal device. To increase a screen-to-body ratio, the sound-emitting hole may alternatively be disposed on a side surface of the terminal device. The following uses the third sound-emitting unit 330 in FIG. 11 as an example for brief description.

Figure 12:
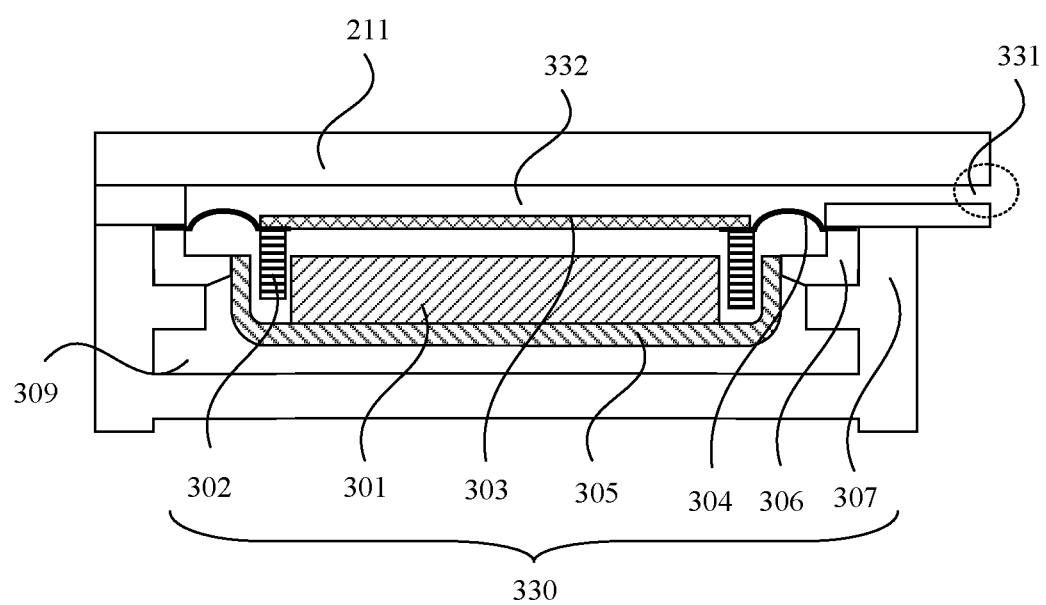
FIG. 12 is a schematic sectional view of a sound-emitting unit according to an embodiment of this application.

FIG. 12 is a schematic sectional view of the third sound-emitting unit 330 in FIG. 11 cut along a sectional line A-A. For example, the third sound-emitting unit 330 is a moving coil speaker. As shown in FIG. 12, the third sound-emitting unit 330 includes a magnet 301, a voice coil 302, a vibrating diaphragm 303, a vibrating diaphragm spider 304, a basket 305, a frame 306, and a case 307. The magnet 301 is disposed in the basket 305, and a gap exists between the magnet 301 and an inner wall of the basket 305. The voice coil 30 is inserted into the gap between the magnet 301 and the inner wall of the basket 305. The voice coil 302 is connected to the frame 306 by using the vibrating diaphragm spider 304, and an edge of the vibrating diaphragm 303 is connected to the vibrating diaphragm spider 304. After being powered on, the voice coil 302 generates a magnetic field that interacts with a magnetic field of the magnet 301. The voice coil 302 drives the vibrating diaphragm 303 to vibrate. The vibrating diaphragm spider 304 can ensure that the voice coil 302 moves in an axial direction of the third sound-emitting unit 330, and limit horizontal motion of the voice coil. The basket 305 may implement a magnetic isolation function. The case 307 may be configured to fix the frame 306, the case 307 and the basket 305 form a rear sound cavity 309, and the rear sound cavity 309 is sealed and is configured to correct a low-frequency sound signal. The third sound-emitting unit 330 may be disposed on a middle frame 211, and a slot is disposed in the middle frame 211 to form a front sound cavity with the vibrating diaphragm 303 of the third sound-emitting unit 330. The front sound cavity is a lower sound guide channel 332. A lower sound-emitting hole 331 is disposed on a side surface of the middle frame 211 of the terminal device, and the lower sound-emitting hole 331 is an outlet that is of the lower sound guide channel 332 and that extends to the side surface of the terminal.

It should be understood that FIG. 12 shows only an example of a structure of a sound-emitting unit and a position of a sound-emitting hole. A person skilled in the art may deform the structure of the sound-emitting unit based on a specific requirement, or select an appropriate position of the sound-emitting hole. This is not specifically limited in this embodiment of this application.

Figure 13:
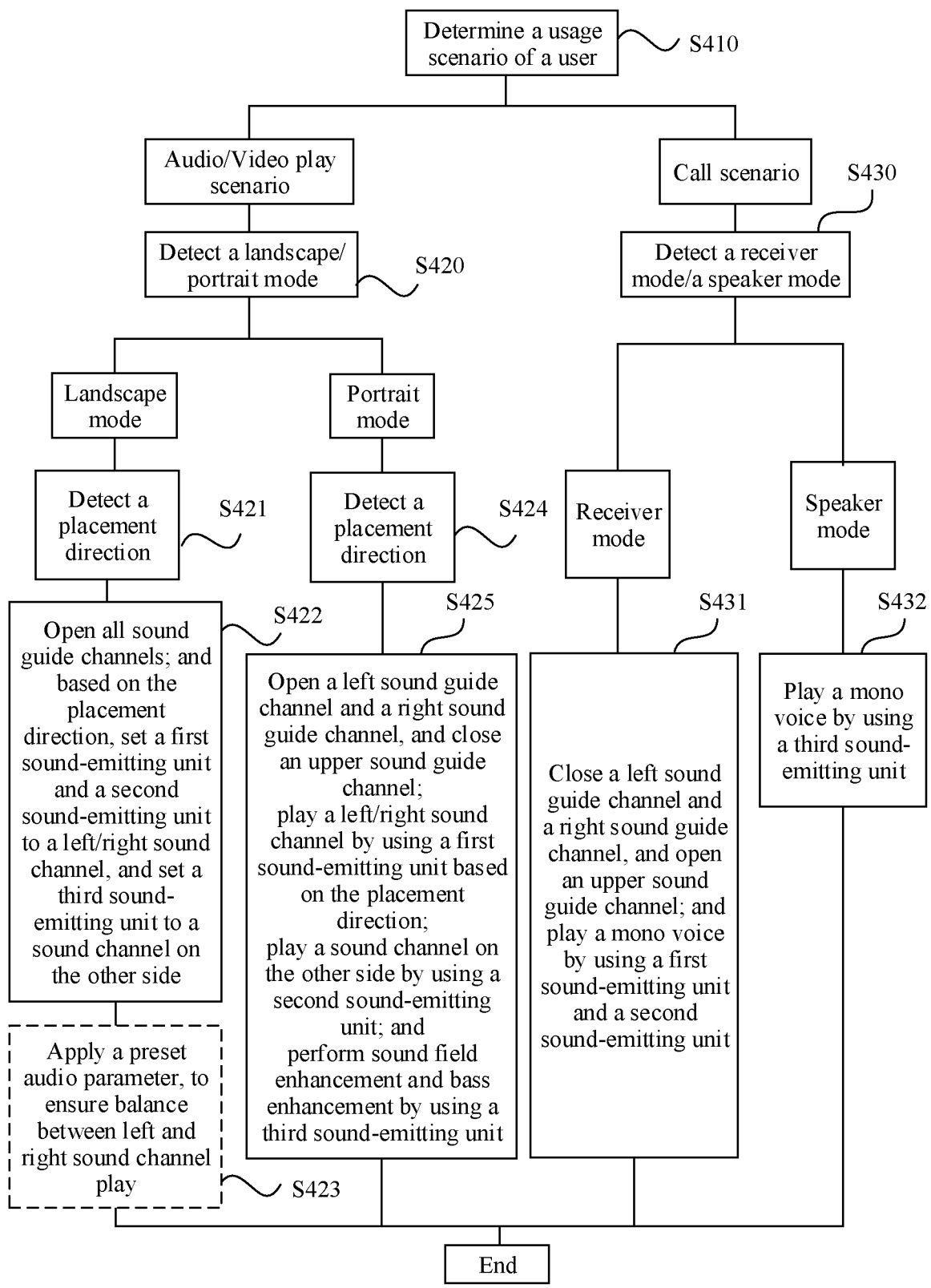
FIG. 13 is a schematic diagram of working logic for controlling playing of a sound-emitting unit according to an embodiment of this application.

FIG. 13 is a schematic diagram of working logic for controlling playing of a sound-emitting unit according to an embodiment of this application. The following provides detailed descriptions with reference to FIG. 6 to FIG. 8, and FIG. 13.

First, when none of sound-emitting units of a terminal device works, each sound-emitting unit on the terminal device may be in an initial state. For example, a left sound guide channel 312 and a first upper sound guide channel 313 connected to a first sound-emitting unit 310 are in an open state; a right sound guide channel 322 and a second upper sound guide channel 323 connected to a second sound-emitting unit 320 are in an open state; and no control component is disposed on a lower sound guide channel 332 connected to a third sound-emitting unit 330. Therefore, the lower sound guide channel is in a normally open state, and whether the lower sound guide channel transmits a sound is synchronous with whether the third sound-emitting unit 330 works and emits a sound.

In step S410, the terminal device determines a usage scenario of a user.

In this embodiment of this application, the usage scenario of the user is a scenario in which a sound-emitting unit needs to be used to play a sound, for example, an audio/video play scenario, a video play scenario, or a call scenario. The call scenario may include a voice call scenario, a video call scenario, a ringtone reminder, or the like. A manner in which the sound-emitting unit plays a sound in the call scenario may further include a speaker mode and a receiver mode. The speaker mode may also be referred to as a loudspeaker mode, and a sound is relatively high. In the receiver mode, a sound is relatively low, and usually, the sound can be heard only when the sound-emitting unit is close to an ear. A manner in which the sound-emitting unit plays a sound in the audio/video play scenario is usually the speaker mode.

The terminal device may determine the usage scenario according to a user operation instruction. For example, the user taps a play control in an audio/video play application, and the terminal device may determine, based on a corresponding signal or instruction of the play control, that the user is to use the terminal device to perform audio play or video play. For another example, the terminal device receives an incoming call, and the terminal device may determine, based on a communication request or a corresponding signal or instruction generated when the user taps an answering control, that the user is using the terminal device for a call. For another example, when the user taps a control for making a voice call or a video call in a real-time communication application, or taps a control for answering a voice call or a video call in a real-time communication application, the terminal device may determine, based on a corresponding signal or instruction generated when the user taps the control, that the user is using the terminal device for a voice call or a video call.

In one case, the terminal device determines that the usage scenario of the user is the audio/video play scenario. When the user plays audio or video content by using the terminal device, stereo output can be implemented regardless of whether the terminal device is used in a landscape mode or a portrait mode, thereby providing better user experience.

To implement stereo, a landscape/portrait mode of the terminal device needs to be detected, and a working manner of a sound-emitting unit needs to be determined based on a posture of the terminal device. Therefore, in step S420, the terminal device detects the landscape/portrait mode.

When the terminal device is in a landscape mode, an upper part of the terminal device may be on a same side as a left ear of the user, or may be on a same side as a right ear of the user. Therefore, in step S421, a placement direction of the terminal device is detected. In this embodiment of this application, usage status information such as the landscape/portrait mode and the placement direction of the terminal device may be obtained by using a sensor, for example, a gravity sensor or a direction sensor (such as a gyroscope). For example, the gravity sensor may be used to obtain posture information of the terminal device, including the landscape mode, the portrait mode, a tilt angle, or the like. The direction sensor may be used to obtain a direction status of the terminal device, for example, an upright state, an upside-down state, a left horizontal state, a right horizontal state, a tilt state, or an overlooking state, and sense an azimuth, a rotation angle, a tilt angle, and the like on a horizontal plane.

It should be understood that steps S410, S420, and S421 are performed independently of each other. A sequence of steps S410, S420, and S421 is not limited in this embodiment of this application. For example, step S420 of detecting the landscape/portrait mode and step S421 of detecting the placement direction may be performed at the same time, that is, information about the landscape/portrait mode and the placement direction of the terminal device is obtained at the same time. For another example, step S420 of detecting the landscape/portrait mode and step S421 of detecting the placement direction may be performed before or simultaneously with step S410 of determining the usage scenario of the user. For another example, the terminal device may obtain the information about the landscape/portrait mode by detecting the placement direction. In this case, steps S420 and S421 may be combined into one step. In this embodiment of this application, only an example of information that needs to be obtained for determining a working manner of a sound-emitting unit in different usage scenarios is described.

After a posture and the placement direction of the terminal device are determined, the working manner of the sound-emitting unit and an open/closed state of a sound guide channel are determined. In step S422, all sound guide channels are opened, and based on the placement direction of the terminal device, the first sound-emitting unit 310 and the second sound-emitting unit 320 are set to a left/right sound channel, and the third sound-emitting unit 330 is set to a sound channel on the other side. Specifically, if an upper part of the terminal device is on the same side as a left ear of the user, the first sound-emitting unit 310 and the second sound-emitting unit 320 each are set to the left sound channel, and the third sound-emitting unit 330 is set to the right sound channel; or if an upper part of the terminal device is on the same side as a right ear of the user, the first sound-emitting unit 310 and the second sound-emitting unit 320 each are set to the right sound channel, and the third sound-emitting unit 330 is set to the left sound channel.

Opening all the sound guide channels herein means that all the sound guide channels can transmit a sound. Specifically, for example, after receiving an instruction of a central processing unit CPU, the control component may control the left sound guide channel 312 and the first upper sound guide channel 313 to be opened. In this way, a sound emitted by the first sound-emitting unit 310 may be guided to the outside of the terminal device through the left sound guide channel 312 and the first upper sound guide channel 313. For another example, after receiving an instruction of a central processing unit CPU, the control component may control the right sound guide channel 322 and the second upper sound guide channel 323 to be opened. In this way, a sound emitted by the second sound-emitting unit 320 may be guided to the outside of the terminal device through the right sound guide channel 322 and the second upper sound guide channel 323. The lower sound guide channel 332 is actually in a normally open state. When the third sound-emitting unit 330 works, a sound emitted by the third sound-emitting unit 330 is guided to the outside of the terminal device through the lower sound guide channel 332.

In this way, when the terminal device plays audio/a video in a landscape mode, a sound-emitting unit on a same side as the left ear of the user plays the left sound channel, and a sound-emitting unit on a same side as the right ear of the user plays the right sound channel, so that landscape-mode stereo play can be implemented.

Optionally, to improve user experience, in step S423, a preset audio parameter may be further applied, to ensure balance of left and right sound channel play, so that volume of the left sound channel and the right sound channel heard by the user are consistent.

It should be understood that in step S422, a quantity of working sound-emitting units and a quantity of opened sound guide channels may be alternatively set in another manner. For example, only the first upper sound guide channel 313, the second upper sound guide channel 323, and the lower sound guide channel 332 are opened; or only the left sound guide channel 312, the right sound guide channel 322, and the lower sound guide channel 332 are opened; or only the first sound-emitting unit 310 or only the second sound-emitting unit 320 plays a sound channel on one side, and the third sound-emitting unit 330 plays a sound channel on another side. For details, refer to the foregoing related descriptions. For brevity, details are not described again.

When the terminal device is in a portrait mode, the upper part of the terminal device may be upward. In this case, the first sound-emitting unit 310 is on a same side as the left ear of the user, and the second sound-emitting unit 320 is on a same side as the right ear of the user. The upper part of the terminal device may alternatively be downward. In this case, the first sound-emitting unit 310 is on a same side as the right ear of the user, and the second sound-emitting unit 320 is on a same side as the left ear of the user. Therefore, in step S424, a placement direction of the terminal device is detected, that is, whether the terminal device is upright or upside down is detected.

After a posture and the placement direction of the terminal device are determined, the working manner of the sound-emitting unit and an open/closed state of a sound guide channel are determined. In step S425, the left sound guide channel 312 and the right sound guide channel 322 are opened, and an upper sound guide channel is closed. Based on the placement direction, the first sound-emitting unit 310 plays the left/right sound channel, the second sound-emitting unit 320 plays the sound channel on the other side, and the third sound-emitting unit 330 performs sound field enhancement and bass enhancement. Specifically, if the upper part of the terminal device is upward, the first sound-emitting unit 310 plays the left sound channel, the second sound-emitting unit 320 plays the right sound channel, and the third sound-emitting unit 330 performs sound field enhancement and bass enhancement. If the upper part of the terminal device is downward, the first sound-emitting unit 310 plays the right sound channel, the second sound-emitting unit 320 plays the left sound channel, and the third sound-emitting unit 330 performs sound field enhancement and bass enhancement. Herein, that the upper sound guide channel is closed includes that the first upper sound guide channel 313 and the second upper sound guide channel 323 are closed. In this way, a sound emitted by the first sound-emitting unit 310 may be guided to the outside of the terminal device through the left sound guide channel 312, and a sound emitted by the second sound-emitting unit 320 may be guided to the outside of the terminal device through the right sound guide channel 322. The lower sound guide channel 332 is actually in a normally open state. When the third sound-emitting unit 330 works, a sound emitted by the third sound-emitting unit 330 is guided to the outside of the terminal device through the lower sound guide channel 332.

In this way, when the terminal device plays audio/a video in a portrait mode, a sound-emitting unit on a same side as the left ear of the user plays the left sound channel, and a sound-emitting unit on a same side as the right ear of the user plays the right sound channel, so that portrait-mode stereo play can be implemented. The third sound-emitting unit 330 performs sound field enhancement and bass enhancement to improve sound quality.

Optionally, because the user usually uses the terminal device upright, step S424 may not be performed. When the terminal device detects that the terminal device is in a portrait mode, step S425 is directly performed, that is, the first sound-emitting unit is configured to play the left sound channel, and the second sound-emitting unit is configured to play the right sound channel. Other steps are the same as the foregoing steps, and details are not described again.

It should be understood that in step S425, a quantity of working sound-emitting units and a quantity of opened sound guide channels may be alternatively set in another manner. For example, the first upper sound guide channel 313 and/or the second upper sound guide channel 323 are/is also opened, or the third sound-emitting unit 330 does not work. For details, refer to the foregoing related descriptions. For brevity, details are not described again.

In another case, the terminal device determines that the usage scenario of the user is the call scenario. When the user uses the terminal device for a call, the sound-emitting unit usually plays a mono sound channel, but there is a receiver mode or a speaker mode. After it is determined that the usage scenario of the user is the call scenario, in step S430, a call mode is detected, that is, the receiver mode or the speaker mode is detected.

When the terminal device is in the receiver mode, step S431 is performed: The left sound guide channel 312 and the right sound guide channel 322 are closed, an upper sound guide channel is opened, and the first sound-emitting unit 310 and the second sound-emitting unit 320 play a mono voice. Herein, that the upper sound guide channel is opened includes that the first upper sound guide channel 313 and the second upper sound guide channel 323 are opened. In this way, when a call occurs in the receiver mode, the first sound-emitting unit 310 and the second sound-emitting unit 320 play voices, and the voices are guided to the outside of the terminal device through the first upper sound guide channel 313 and the second upper sound guide channel 323. When the terminal device is in the receiver mode, volume of a sound emitted by each of the first sound-emitting unit 310 and the second sound-emitting unit 320 may not exceed a volume threshold, thereby ensuring user call privacy.

In some embodiments, step S430 may not be performed. For example, when the user answers or makes a call, the terminal device may be in the receiver mode by default. When the user taps a speaker control or the like, in response to the user operation, the terminal device performs working sound-emitting unit switching. Alternatively, when the user uses specific communication software for a voice call or a video call, the terminal device may be in the speaker mode by default according to the communication software used by the user.

When the terminal device is in the speaker mode, step S432 is performed: The third sound-emitting unit 330 plays a mono voice, and the mono voice is guided to the outside of the terminal device through the lower sound guide channel 332. Because neither of the first sound-emitting unit 310 and the second sound-emitting unit 320 emits a sound, sound guide channels connected to the first sound-emitting unit 310 and the second sound-emitting unit 320 may be in an open state, or may be in a closed state. This is not specifically limited in this embodiment of this application. It should be understood that, when the terminal device is in the speaker mode, the first sound-emitting unit 310 and/or the second sound-emitting unit 320 may alternatively be selected to play a mono voice, or all sound-emitting units play a mono voice. A person skilled in the art may perform a corresponding design based on a specific requirement. This is not specially limited herein.

The terminal device according to this embodiment of this application includes three sound-emitting units: the first sound-emitting unit and the second sound-emitting unit that are disposed at the upper part of the terminal device, and the third sound-emitting unit that is disposed at the bottom of the terminal device. The first sound-emitting unit is connected, through the left sound guide channel and the first upper sound guide channel, to the left sound-emitting hole on a left side of the terminal device and the upper sound-emitting hole on an upper side of the terminal device, the second sound-emitting unit is separately connected, through the right sound guide channel and the second upper sound guide channel, to the right sound-emitting hole on the right side of the terminal device and the upper sound-emitting hole on the upper side of the terminal device. When the terminal device is used in a portrait mode, the first sound-emitting unit and the second sound-emitting unit may respectively play the left sound channel and the right sound channel, thereby implementing portrait-mode stereo output. When the terminal device is used in a landscape mode, the first sound-emitting unit and/or the second sound-emitting unit may play a sound channel on one side in dual sound channels, and the third sound-emitting unit plays a sound channel on the other side in the dual sound channels, thereby implementing landscape-mode stereo output. In addition, the terminal device in this embodiment of this application can further provide different sound emitting solutions based on the usage scenarios of the user. For example, in the audio/video play scenario, the terminal device can provide stereo play, to improve user experience; and in the call scenario, the first sound-emitting unit and/or the second sound-emitting unit can be used to play a sound, and the sound is transmitted through the upper sound guide channel, to implement a receiver function and ensure call privacy.

Figure 14:
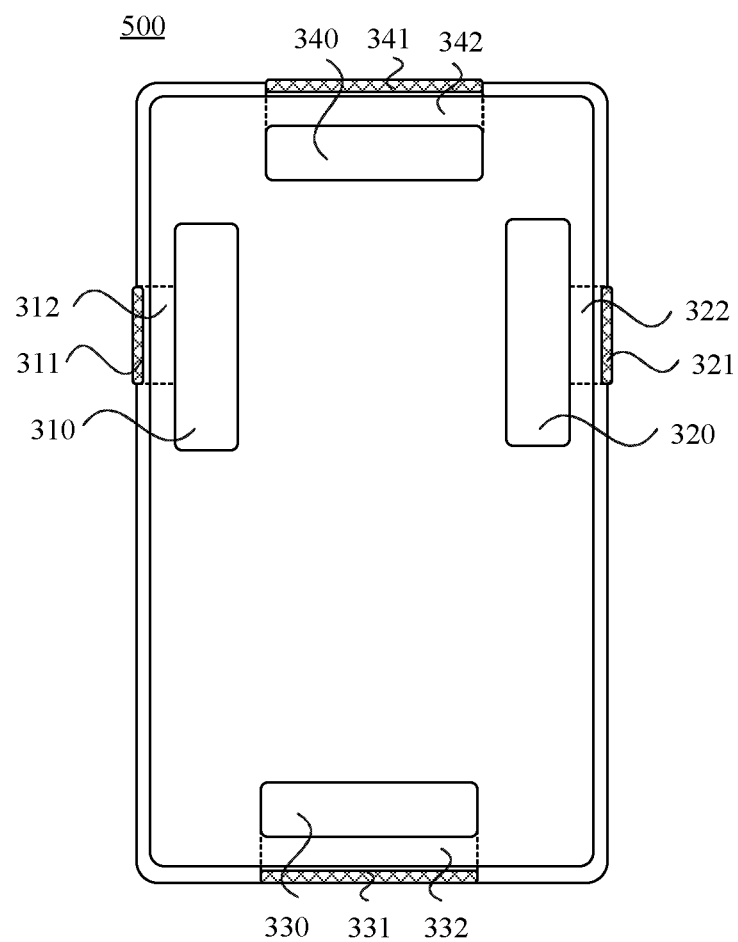
FIG. 14 is a schematic diagram of a structure of another terminal device according to an embodiment of this application.

FIG. 14 is a schematic diagram of a structure of another terminal device according to an embodiment of this application. As shown in FIG. 14, the terminal device 500 includes a first sound-emitting unit 310, a second sound-emitting unit 320, a third sound-emitting unit 330, and a fourth sound-emitting unit 340. The first sound-emitting unit 310 and the second sound-emitting unit 320 are arranged in a width direction of the terminal device, and the third sound-emitting unit 330 and the fourth sound-emitting unit 340 are arranged in a length direction of the terminal device.

For example, the first sound-emitting unit 310 and the second sound-emitting unit 320 are disposed on a left side and a right side of the terminal device. The first sound-emitting unit 310 and the second sound-emitting unit 320 may be disposed at positions close to the top of the terminal device 500, so that an area frequently held by a user can be avoided, and a sound-emitting hole is prevented from being blocked by a hand of the user. Preferably, the first sound-emitting unit 310 and the second sound-emitting unit 320 are leveled in the width direction. The third sound-emitting unit 330 and the fourth sound-emitting unit 340 are disposed on an upper side and a lower side of the terminal device. Preferably, the fourth sound-emitting unit 340 is disposed in the middle of the upper side of the terminal device, so that when the user answers a call, a sound can directly enter an ear, thereby improving privacy of a call process.

A left sound-emitting hole 311, a right sound-emitting hole 322, a lower sound-emitting hole 331, and an upper sound-emitting hole 341 are respectively disposed on four sides of the terminal device 500, and the four sound-emitting holes emit sounds to the terminal device 500 upward, downward, leftward, and rightward. The first sound-emitting unit 310 is connected to the left sound-emitting hole 311 by using a left sound guide channel 312, the second sound-emitting unit 320 is connected to the right sound-emitting hole 321 by using a right sound guide channel 322, the third sound-emitting unit 330 is connected to the lower sound-emitting hole 331 by using a lower sound guide channel 332, and the fourth sound-emitting unit 340 is connected to the upper sound-emitting hole 341 by using an upper sound guide channel 342.

The figure shows only an example of locations of sound-emitting units, sound guide channels, and sound-emitting holes. It should be understood that a person skilled in the art may perform a corresponding design based on an actual requirement.

Figure 15:
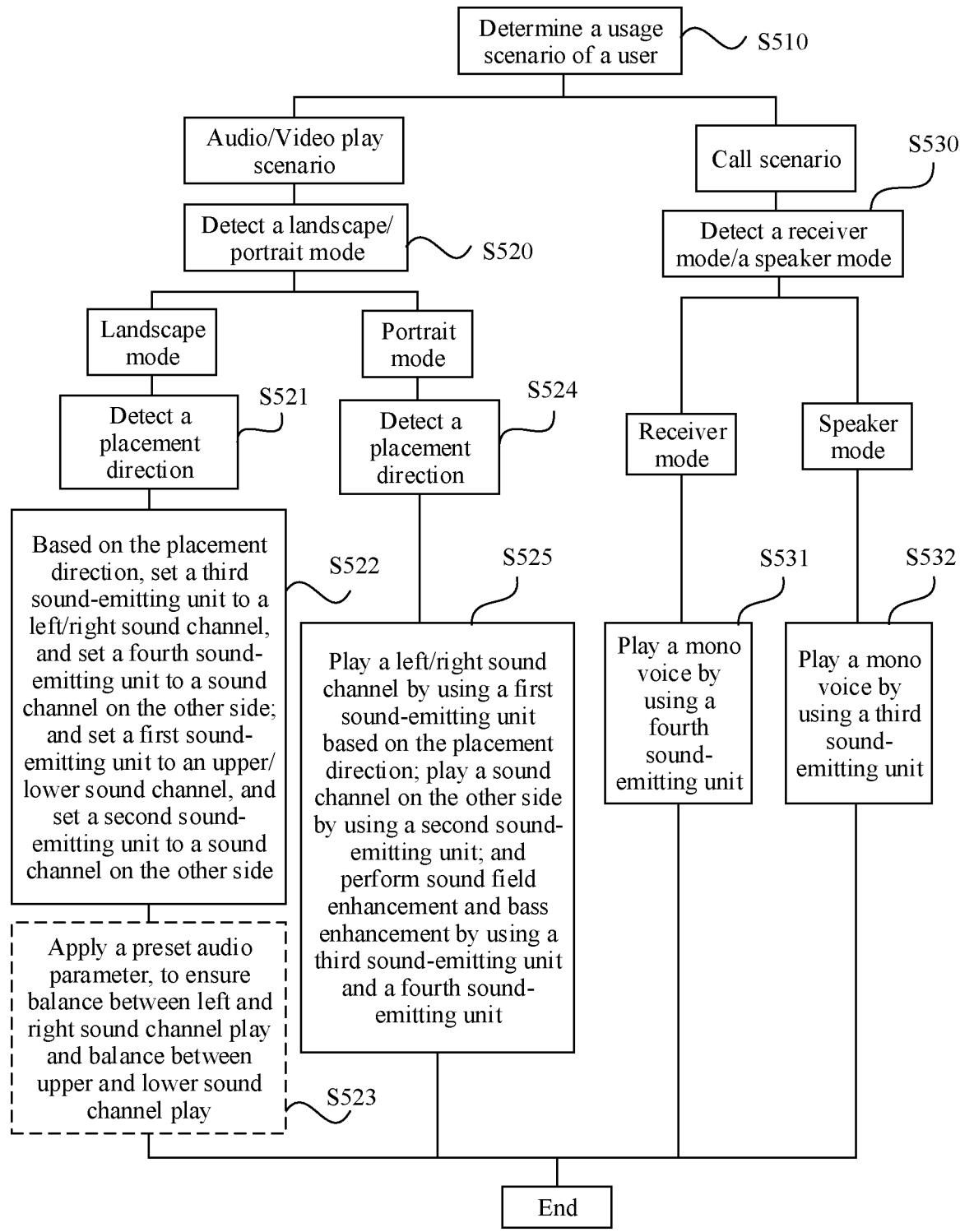
FIG. 15 is a schematic diagram of working logic for controlling playing of a sound-emitting unit according to an embodiment of this application.

FIG. 15 is a schematic diagram of working logic for controlling playing of a sound-emitting unit according to an embodiment of this application. The following provides detailed descriptions with reference to FIG. 14 and FIG. 15. The working logic shown in FIG. 15 is similar to that shown in FIG. 13. Step S5xx corresponds to step S4xx. The following describes only differences in detail. For other details, refer to related descriptions in FIG. 13.

In step S510, a usage scenario of a user is determined.

In one case, the terminal device determines that the usage scenario of the user is an audio/video play scenario.

In step S520, the terminal device detects a landscape/portrait mode.

When the terminal device is in the landscape mode, in step S521, a placement direction is detected.

In step S522, based on the placement direction, the third sound-emitting unit is set to a left/right sound channel, and the fourth sound-emitting unit is set to a sound channel on the other side; and the first sound-emitting unit is set to an upper/lower sound channel, and the second sound-emitting unit is set to a sound channel on the other side. Specifically, if an upper part of the terminal device is on the same side as a left ear of the user, the fourth sound-emitting unit 340 is set to the left sound channel, the third sound-emitting unit 330 is set to the right sound channel, the second sound-emitting unit 320 is set to the upper sound channel, and the first sound-emitting unit 310 is set to the lower sound channel. If the upper part of the terminal device is on the same side as a right ear of the user, the third sound-emitting unit 330 is set to the left sound channel, the fourth sound-emitting unit 340 is set to the right sound channel, the first sound-emitting unit 310 is set to the upper sound channel, and the second sound-emitting unit 320 is set to the lower sound channel. The four sound-emitting units work independently, and respectively play the upper, lower, left, and right sound channels by using respective corresponding sound guide channels, so that multi-channel stereo can be implemented when the landscape mode is used.

The upper sound channel and the lower sound channel in this embodiment of this application may be a sky sound channel and a ground sound channel that are separately obtained during recording, or may be sound channels that are separated through algorithm processing.

Optionally, in step S523, a preset audio parameter is applied, to ensure balance of left and right sound channel playing and balance of upper and lower sound channel playing.

Optionally, when the terminal device is in the landscape mode, the first sound-emitting unit 310 and the second sound-emitting unit 320 may not play the upper sound channel and the lower sound channel, but perform sound field rendering and bass rendering.

When the terminal device is in the portrait mode, in step S524, a placement direction is detected.

In step S525, based on the placement direction, the first sound-emitting unit 310 plays the left/right sound channel, the second sound-emitting unit plays the sound channel on the other side, and the third sound-emitting unit and the fourth sound-emitting unit perform sound field enhancement and bass enhancement. Specifically, if the upper part of the terminal device is upward, the first sound-emitting unit 310 plays the left sound channel, the second sound-emitting unit 320 plays the right sound channel, and the third sound-emitting unit 330 and the fourth sound-emitting unit 340 perform sound field enhancement and bass enhancement. If the upper part of the terminal device is downward, the first sound-emitting unit 310 plays the right sound channel, the second sound-emitting unit 320 plays the left sound channel, and the third sound-emitting unit 330 and the fourth sound-emitting unit 340 perform sound field enhancement and bass enhancement. The four sound-emitting units work independently. The first sound-emitting unit 310 and the second sound-emitting unit 320 respectively play the left sound channel and the right sound channel by using respective corresponding sound guide channels, so that multi-channel stereo can be implemented when the portrait screen is used. The third sound-emitting unit and the fourth sound-emitting unit perform sound field enhancement and bass enhancement, so that sound quality can be improved.

Optionally, when the terminal device is in the portrait mode, the third sound-emitting unit and the fourth sound-emitting unit may be configured to play the upper sound channel and the lower sound channel, but do not perform sound field rendering and bass rendering.

In another case, the terminal device determines that the usage scenario of the user is a call scenario.

In step S430, a call mode is detected, that is, a receiver mode/a speaker mode is detected.

When the terminal device is in the receiver mode, in step S531, the fourth sound-emitting unit 340 plays a mono voice, and the other sound-emitting units do not work. The fourth sound-emitting unit 340 guides a sound through the upper sound-emitting hole 341, and volume of the sound guided by the fourth sound-emitting unit 340 may not exceed a volume threshold, thereby ensuring user call privacy.

When the terminal device is in the speaker mode, in step S532, the third sound-emitting unit 330 plays a mono voice, and the other sound-emitting units may play a mono voice at the same time, or may not play a mono voice.

The terminal device in this embodiment of this application includes the four sound-emitting units disposed on an upper side, a lower side, a left side, and a right side of the terminal device. Each sound-emitting unit may work independently. This can provide dual-channel or four-channel stereo audio play experience, enhance immersion during audio and video play, and improve user experience. For example, when the terminal device is used in a portrait mode, for example, plays audio/video content in the portrait mode, the first sound-emitting unit 310 and the second sound-emitting unit 320 respectively play the left sound channel and the right sound channel, so that stereo play can be implemented in a portrait-mode play scenario. When the terminal device is used in a landscape mode, for example, plays audio and video content in the landscape mode, the third sound-emitting unit 330 and the fourth sound-emitting unit 340 respectively play the left sound channel and the right sound channel, so that stereo play can be implemented in a landscape-mode play scenario. When the four sound-emitting units all play content of different channels, four-channel stereo play can be provided.

It should be noted that the terminal device in this embodiment of this application may further include more sound-emitting units and corresponding sound guide channels. For example, the terminal device includes five, six, seven, or more sound-emitting units. The plurality of sound-emitting units included in the terminal device can play different sound content, thereby implementing landscape/portrait-mode stereo play effects of more sound channels. One of the plurality of sound-emitting units included in the terminal device may play a bass sound channel. In this way, stereo play effects of sound channels 3.1, 4.1, 5.1, and 6.1 are implemented.

Figure 16:
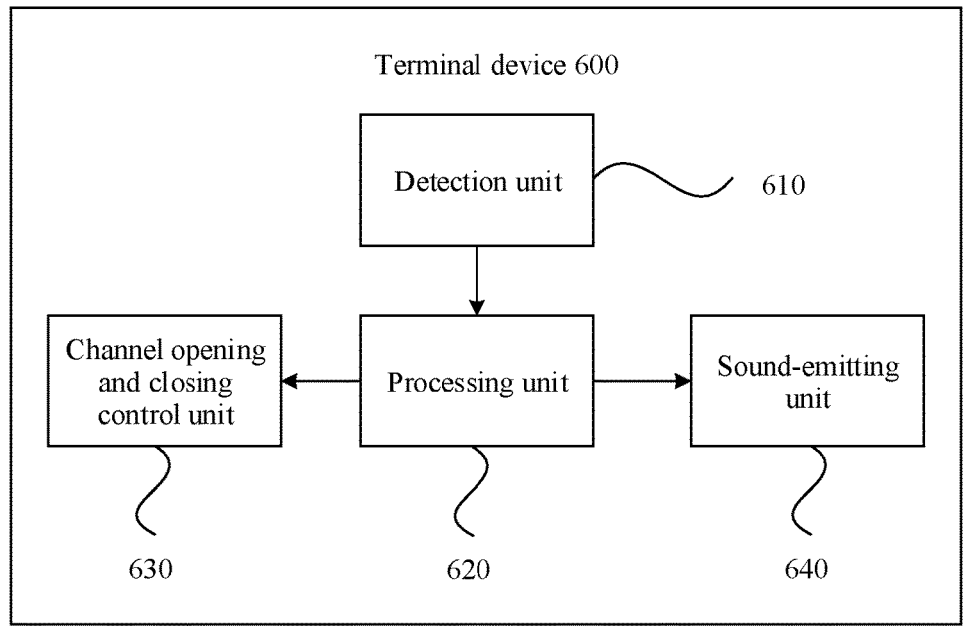
FIG. 16 is a schematic block diagram of a terminal device according to an embodiment of this application.

FIG. 16 is a schematic block diagram of a terminal device according to an embodiment of this application. As shown in the figure, the terminal device 600 includes a detection unit 610, a processing unit 620, a channel opening and closing control unit 630, and a sound-emitting unit 640. The sound-emitting unit 640 includes the first sound-emitting unit 310, the second sound-emitting unit 320, and the third sound-emitting unit 330. The first sound-emitting unit 310 and the second sound-emitting unit 320 have two sound guide channels. Therefore, each sound guide channel in the first sound-emitting unit 310 and the second sound-emitting unit 320 corresponds to one channel opening and closing control unit 630. The third sound-emitting unit 330 has a sound guide channel, and no channel opening and closing control unit 630 is disposed.

The detection unit 610 is configured to detect usage status information of the terminal device, for example, a motion posture, a placement direction, and a user operation of the terminal device. The detection unit 610 outputs the obtained usage status information to the processing unit 620.

The detection unit 610 may be the gyroscope sensor 180B, the acceleration sensor 180E, or the like in a hardware block diagram shown in FIG. 1, may detect posture information such as a rotation direction and an inclination angle of the terminal device, and is configured to determine that the terminal device is in a landscape/portrait mode, determine a placement direction, and the like. Alternatively, the detection unit 610 may be a pressure sensor 180A, a touch sensor 180K, or the like, and may detect a touch operation of a user, to further obtain that the user sets the terminal device in a receiver mode/a speaker mode, or the like.

An input of the processing unit 620 is connected to the detection unit 610, and an output thereof is connected to the sound-emitting unit 630 and the channel opening and closing control unit 640. The processing unit 620 receives the usage status information of the terminal device that is input by the detection unit 610, and determines a usage scenario of the user, a landscape/portrait mode of the terminal device, a placement direction of the terminal device, and the like based on the usage status information of the terminal device. The usage scenario includes a landscape/portrait stereo play scenario and a call scenario. Further, the processing unit 620 determines a working manner of the sound-emitting unit and an open/closed state of a sound guide channel based on the obtained information.

The processing unit 620 may include a plurality of independent sub-processing units. For example, some sub-processing units may be configured to output control signals, and some sub-processing units may implement audio processing and can output audio signals. The processing unit 620 may alternatively be an integrated unit that outputs a control signal and an audio signal.

The processing unit 620 may be the processor 110 in FIG. 1.

The channel opening and closing control unit 630 is configured to receive a first control signal of the processing unit 620, and correspondingly control an open/closed state of a sound guide channel corresponding to the sound-emitting unit 640. The channel opening and closing control unit 630 may be the control component 350 described above.

The sound-emitting unit 640 is configured to receive a second control signal of the processing unit 620, and work or mute based on the second control signal. The sound-emitting unit 640 may further receive an audio signal sent by the processing unit 620, and the audio signal is played by a working sound-emitting unit.

Figure 17:
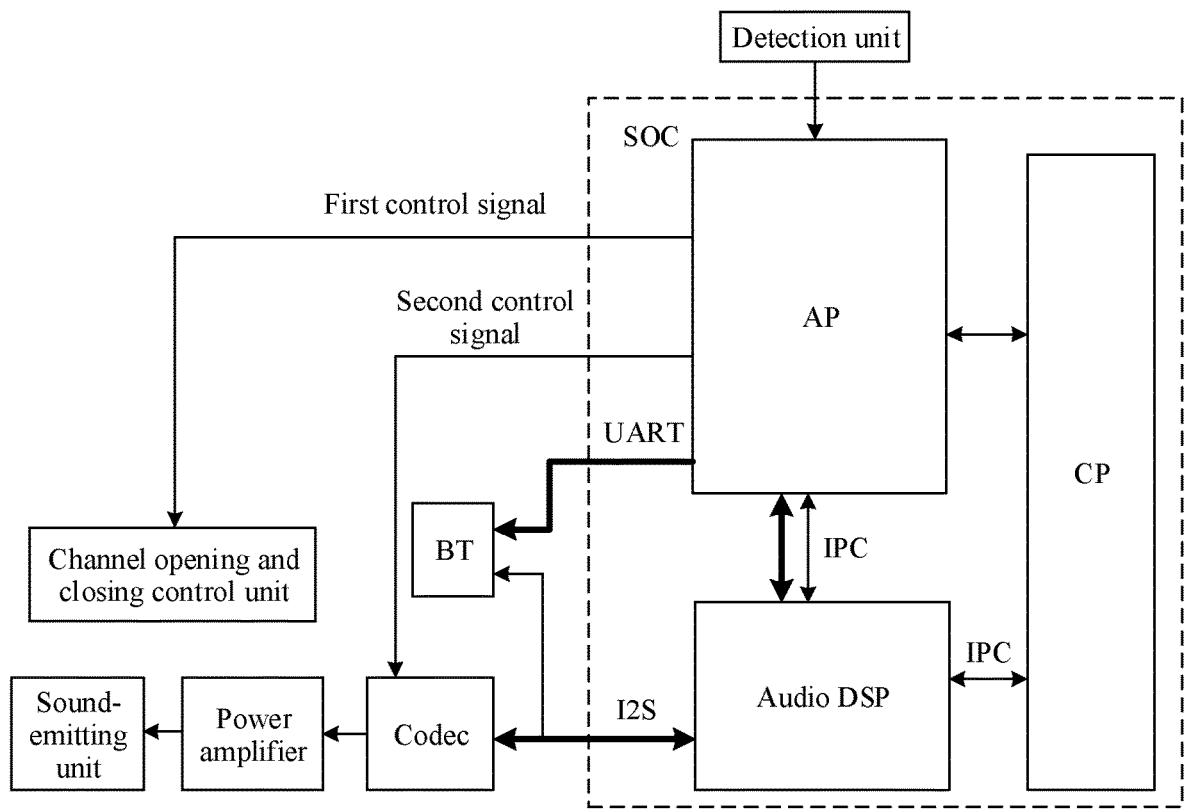
FIG. 17 is a block diagram of audio-related hardware according to an embodiment of this application.

The following describes a method for implementing stereo output according to embodiments of this application with reference to specific embodiments. FIG. 17 is a block diagram of audio-related hardware according to an embodiment of this application, and FIG. 18 is a block diagram of audio-related software according to an embodiment of this application.

Figure 18:
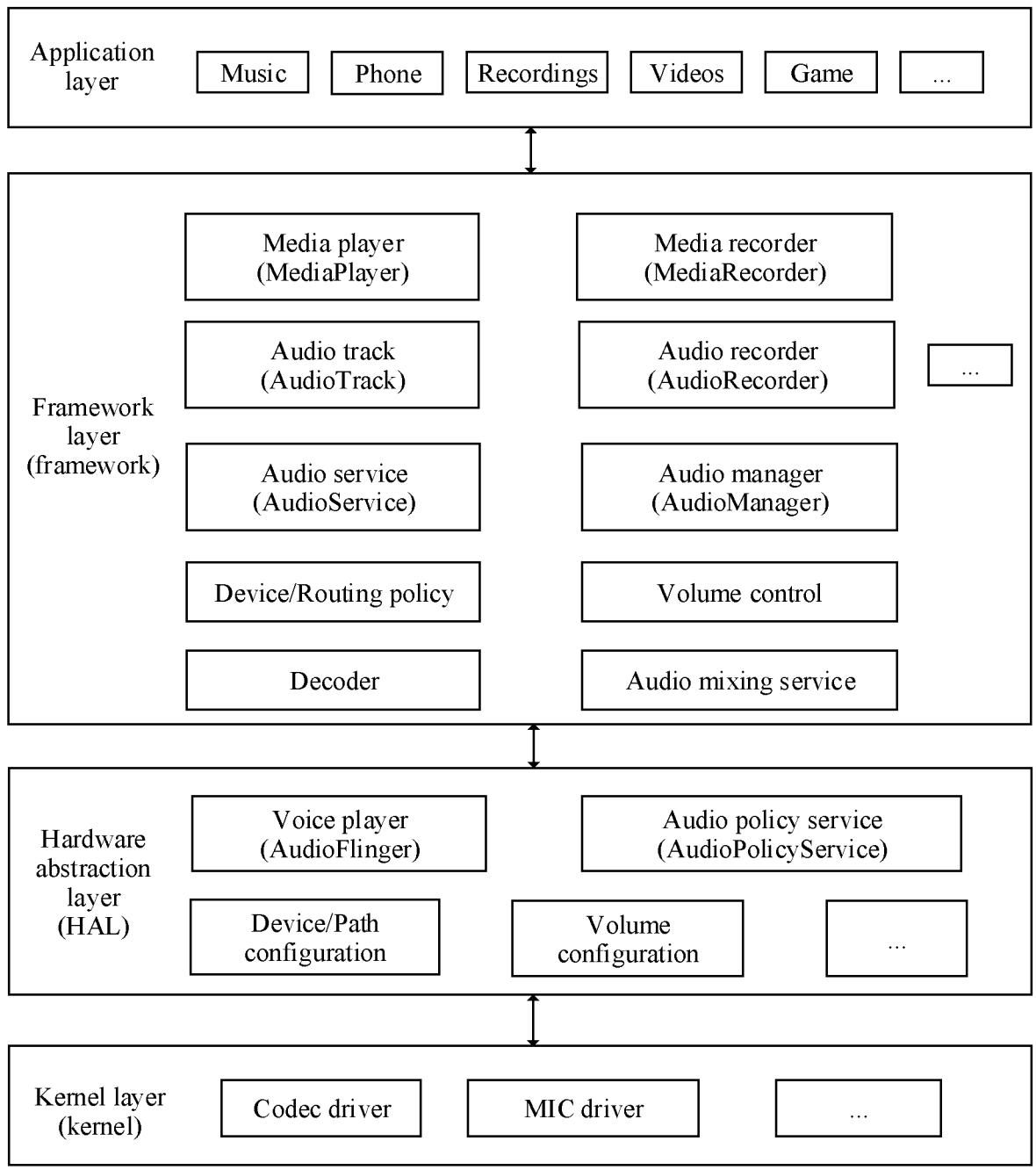
FIG. 18 is a block diagram of audio-related software according to an embodiment of this application.

The following briefly describes an audio processing process of a terminal device with reference to FIG. 17 and FIG. 18.

An application and an operating system (operating system, OS), for example, an Android system (Android), are mainly run on an application processor (application processor, AP) in FIG. 17. A communication processor (communication processor, CP), also referred to as a baseband processor (baseband processor, BP) or a modem (modem), mainly processes a communication-related process, and is mainly used to support several communication standards, provide a multimedia function, and provide interfaces related to a multimedia display, an image sensor, and an audio device. An audio digital signal processor (audio digital signal processor, Audio DSP) is a DSP that processes audio. The AP, the CP, and the audio DSP communicate with each other through inter-processor communication (inter-processor communication, IPC) to exchange control messages and audio data. The AP, the CP, the audio DSP, and a processor with another function may be integrated in a chip, to form a system on chip (system on chip, SOC).

In addition, the terminal device further includes a hardware coder/decoder (encode and decode, codec) chip mainly configured to collect and play audio. During audio collection, an analog signal of the audio is converted into a digital signal (namely, A/D conversion), and then the digital signal is sent to a central processing unit (central processing unit, CPU) through an I2S bus (the codec chip may alternatively be integrated with the CPU chip). When the audio needs to be played, the CPU sends the audio digital signal to the codec chip through the I2S bus, and then converts the digital signal into an analog signal (namely, D/A conversion) for playing. The codec may be controlled by the AP. For example, a second control signal input by the AP is received, so that the codec selects different audio paths. For example, streaming lines for playing music, making a call, and the like inside the codec chip are different. The codec may further perform corresponding processing on the audio signal, for example, volume control and equalization (equalize, EQ) control. The codec exchanges audio data with the audio DSP through the I2S bus.

The hardware codec is connected to various peripherals such as a microphone (microphone, MIC), an earpiece (earpiece), a speaker (speaker), and a wired headset. In this embodiment of this application, an example in which a peripheral is a sound-emitting unit is used for description. Different from the foregoing peripheral, a Bluetooth (Bluetooth, BT) headset has audio collection and play functions, and therefore is directly connected to the audio DSP through the I2S bus. When the Bluetooth headset is used to play music, audio streams are decoded into PCM data on the AP and then transmitted to the Bluetooth headset through a UART instead of the audio DSP through the I2S bus.

A power amplifier (power amplifier, PA) is disposed between the codec and the sound-emitting unit, and is configured to amplify power of an audio signal, and may amplify volume of the sound-emitting unit.

The peripheral of the terminal device in this embodiment of this application further includes a channel opening and closing control unit configured to control an open/closed state of a sound guide channel of the sound-emitting unit. The channel opening and closing control unit may receive a first control signal of the AP, to control a corresponding sound guide channel to be opened or closed.

FIG. 18 mainly shows a block diagram of software of an audio part on the AP in FIG. 17. Herein, that the terminal device is an Android mobile phone is used as an example, and an Android system runs on the AP. Android audio software is divided into different layers, mainly including a kernel layer (kernel), a hardware abstraction layer (HAL layer), a framework layer (framework), an application layer, and the like.

A top layer is the application layer, and includes a series of audio-related applications such as "music", "phone", "recordings", "videos", and "game". A next layer is the framework layer (framework), and the framework layer of the audio part is equivalent to the application framework layer and the system runtime library layer shown in FIG. 1. There are many modules in the framework, mainly including a media player (MediaPlayer), a media recorder (MediaRecorder), an audio track (AudioTrack), an audio recorder (AudioRecorder), an audio service (AudioService), an audio manager (AudioManager), and the like. Specific functions of the foregoing modules are not a focus of discussion in this application, and details are not described herein again. The framework can determine a device/routing policy, volume control, and an audio mixing service. A subsequent layer is the hardware abstraction layer (HAL layer), mainly including a voice player (AudioFlinger) and an audio policy service (AudioPolicyService), and is used to configure a device/path, volume, and the like. A task of the HAL layer is to actually associate the AudioFlinger/AudioPolicyService with a hardware device and ensure that changes at a bottom layer do not affect an upper layer. The kernel layer includes audio drivers such as a codec driver and a MIC driver.

For example, a user uses the terminal device to play audio in a portrait mode. A detection unit may report posture information of the terminal device (for example, the terminal device is in the portrait mode) to the AP in real time. From a perspective of software, the framework obtains the posture information of the terminal device. After the user starts a music play application, the framework can determine that a usage scenario of the user is a portrait-mode audio play scenario. Based on the determined usage scenario, the framework delivers, to the HAL layer, a corresponding policy (for example, in the foregoing, the first sound-emitting unit plays the left sound channel, the second sound-emitting unit plays the right sound channel, and the third sound-emitting unit does not work; the left sound guide channel is opened, the right sound guide channel is opened, and the first upper sound guide channel and the second upper sound guide channel are closed) for playing audio in the portrait mode, to drive the peripheral. The HAL layer may send a control message to a peripheral related to the play policy. From a perspective of hardware, the AP sends the first control signal to the channel opening and closing control unit, so that the channel opening and closing control unit controls opening or closing of a corresponding sound guide channel. For example, the AP sends the first control signal to the channel opening and closing control unit corresponding to the left sound guide channel, so that the channel opening and closing control unit corresponding to the left sound guide channel moves to open the left sound guide channel; and the AP sends the first control signal to the channel opening and closing control unit corresponding to the first upper sound guide channel, so that the channel opening and closing control unit corresponding to the first upper sound guide channel moves to close the first sound guide channel. The AP sends the second control signal to the codec, so that the codec selects a corresponding audio path, for example, determines which sound-emitting units work and which sound-emitting units do not work. This is equivalent to establishing a portrait-mode audio play path. Digital audio signals may be exchanged between the AP and the audio DSP. After performing processing such as re-sampling and audio mixing on audio to be played, the audio DSP sends the digital audio signals to the codec, converts the digital audio signals into analog audio signals, amplifies the analog audio signals based on the determined audio path by using the power amplifier, and plays the analog audio signals on corresponding audio-emitting units. For example, the left sound channel is played by using the first audio-emitting unit, and the right sound channel is played by using the second audio-emitting unit.

In addition, that a user uses a terminal device to answer a call is used an example. After the CP receives a communication request from another terminal device, the CP may notify the AP of information indicating that communication is to be performed. From a perspective of software, the framework obtains information indicating that the terminal device needs to make a call. The framework may determine that the usage scenario of the user is a call scenario, and a receiver mode is initially used by default. Based on the determined usage scenario, the framework delivers, to the HAL layer, a policy (for example, in the foregoing, the first sound-emitting unit and the second sound-emitting unit each play a mono sound channel, and the third sound-emitting unit does not work; and the left sound guide channel is closed, the right sound guide channel is closed, and the first upper sound guide channel and the second upper sound guide channel are opened) corresponding to the call scenario in the receiver mode, to drive the peripheral. The HAL layer may send a control message to a peripheral related to the play policy. From a perspective of hardware, the AP sends the first control signal to the channel opening and closing control unit, so that the channel opening and closing control unit controls opening or closing of a corresponding sound guide channel. For example, the AP sends the first control signal to the channel opening and closing control unit corresponding to the left sound guide channel, so that the channel opening and closing control unit corresponding to the left sound guide channel moves to close the left sound guide channel; and the AP sends the first control signal to the channel opening and closing control unit corresponding to the first upper sound guide channel, so that the channel opening and closing control unit corresponding to the first upper sound guide channel moves to open the first sound guide channel. The AP sends the second control signal to the codec, so that the codec selects a corresponding audio path, for example, determines which sound-emitting units work and which sound-emitting units do not work. This is equivalent to establishing an audio path in the call scenario, and the AP may notify the CP that the path is established. In a downlink direction, the terminal device receives voice data from a peer end through an air interface, processes the data on a network side, and then sends the data to the audio DSP. After receiving the data, the audio DSP decodes, post-processes, and re-samples the data, and then sends the data to the codec chip. The codec converts a digital audio signal into an analog audio signal, amplifies the analog audio signal by using a power amplifier based on the determined audio path, and plays the analog audio signal on a corresponding sound-emitting unit. For example, the first sound-emitting unit and the second sound-emitting unit play a mono voice.

It should be understood that, that the terminal device is in another scenario in which the sound-emitting unit needs to work is similar to the foregoing process, and details are not described herein again.

A person of ordinary skill in the art may be aware that units and algorithm steps in the examples described with reference to the embodiments disclosed in this specification can be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

In several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

In the descriptions of this application, it should be noted that terms "mount", "connected", and "connection" should be understood in a broad sense unless there is a clear stipulation and limitation. For example, "connection" may be a fixed connection, a detachable connection, or an integrated connection; may be a mechanical connection or an electrical connection; and may be a direct connection, an indirect connection through an intermediate medium, or a connection inside two elements. A person of ordinary skill in the art may understand specific meanings of the foregoing terms in this application based on a specific situation.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal, wherein the terminal comprises:
a first sound element, a second sound element, a third sound element, and a left sound-emitting hole; and a right sound-emitting hole, an upper sound-emitting hole, and a lower sound-emitting hole that are disposed on four sides of the terminal;
the first sound element is separately connected to the left sound-emitting hole and the upper sound-emitting hole;
the second sound element is separately connected to the right sound-emitting hole and the upper sound-emitting hole;
the third sound element is connected to the lower sound-emitting hole;
the terminal further comprises a processor; and
when the terminal is configured to play stereo in a portrait mode, the processor controls the first sound element and the second sound element to play sound channels on different sides and emit a sound from the left sound-emitting hole and the right sound-emitting hole; or
when the terminal is configured to play stereo in a landscape mode, the processor controls at least one of the first sound element and the second sound element to play a sound channel on one side and emit a sound from at least one of the left sound-emitting hole, the right sound-emitting hole, and the upper sound-emitting hole, and the processor controls the third sound element to play a sound channel on another side.

2. The terminal according to claim 1, wherein when the terminal is configured to play stereo in the portrait mode, the processor controls the first sound element and the second sound element to play sound channels on different sides, the first sound element emits a sound from only the left sound-emitting hole, and the second sound element emits a sound from only the right sound-emitting hole.

3. The terminal according to claim 1, wherein when the terminal is configured to play stereo in the portrait mode, the processor further controls the third sound element to play a bass sound channel.

4. The terminal according to claim 1, wherein when the terminal is used for a call, the processor controls a playing manner of the sound element based on a call mode.

5. The terminal according to claim 4, wherein the call mode comprises a receiver mode and a speaker mode, and when the terminal is in the receiver mode, the processor controls at least one of the first sound element and the second sound element to play a mono voice and emit a sound from only the upper sound-emitting hole; or
when the terminal is in the speaker mode, the processor controls at least one of the first sound element, the second sound element, and the third sound element to play a mono voice.

6. The terminal according to claim 1, wherein the terminal further comprises sound guide channels that connect the first sound element and the second sound element to the outside of the terminal, and control components,
wherein each of the control components is configured to control an open/closed state of a sound guide channel between at least one of the sound elements and at least one of the sound-emitting holes, and wherein the control components are disposed on all of the sound guide channels.

7. The terminal according to claim 1, wherein the terminal further comprises a control component disposed on a sound guide channel between the first sound element and the left sound-emitting hole and a control component disposed on a sound guide channel between the second sound element and the right sound-emitting hole, and each control component is configured to control an open/closed state of the respective sound guide channel between the respective sound element and the respective sound-emitting hole.

8. The terminal according to claim 1, wherein the terminal further comprises a detection unit, and the detection unit is configured to obtain usage status information of the terminal and output the obtained usage status information to the processor; and
the processor is configured to determine a usage scenario of the terminal based on the usage status information, and the usage scenario comprises a landscape/portrait stereo play scenario and a call scenario.

9. The terminal according to of claim 1, wherein the first sound element and the second sound element are disposed at an upper part of the terminal, and the third sound element is disposed at a lower part of the terminal.

10. The terminal according to claim 9, wherein the first sound element and the second sound element are respectively disposed on a left side and a right side of the terminal, or the first sound element and the second sound element are disposed in the middle of the terminal.

11. The terminal according to claim 1, wherein the first sound element, the second sound element, and the third sound element are all speakers; or the first sound element and the second sound element are receivers, and the third sound element is a speaker.

12. A method for implementing stereo output, applied to a terminal, wherein the terminal comprises a first sound element, a second sound element, and a third sound element; and a left sound- emitting hole, a right sound-emitting hole, an upper sound-emitting hole, and a lower sound-emitting hole that are disposed on four sides of the terminal, the first sound element is separately connected to the left sound-emitting hole and the upper sound-emitting hole, the second sound element is separately connected to the right sound-emitting hole and the upper sound-emitting hole, and the third sound element is connected to the lower sound-emitting hole; and
the method comprises:
when the terminal is configured to play stereo in a portrait mode, controlling the first sound element and the second sound element to play sound channels on different sides and emit a sound from the left sound-emitting hole and the right sound-emitting hole; or
when the terminal is configured to play stereo in a landscape mode, controlling at least one of the first sound element and the second sound element to play a sound channel on one side and emit a sound from at least one of the left sound-emitting hole, the right sound-emitting hole, and the upper sound-emitting hole, and controlling the third sound element to play a sound channel on another side.

13. The method according to claim 12, wherein when the terminal is configured to play stereo in the portrait mode, the first sound element and the second sound element are controlled to play sound channels on different sides, the first sound element emits a sound from only the left sound-emitting hole, and the second sound element emits a sound from only the right sound-emitting hole.

14. The method according to claim 12, wherein when the terminal is configured to play stereo in the portrait mode, the method further comprises:
controlling the third sound element to play a bass sound channel.

15. The method according to claim 12, further comprising:
when the terminal is used for a call, controlling a playing manner of a sound element based on a call mode, wherein the call mode comprises a receiver mode and a speaker mode, and when the terminal is in the receiver mode, at least one of the first sound element and the second sound element is controlled to play a mono voice and emit a sound from only the upper sound-emitting hole; or
when the terminal is in the speaker mode, at least one of the first sound element, the second sound element, and the third sound element is controlled to play a mono voice.

16. The method according to claim 12, wherein the terminal further comprises control components, and the control component is configured to control an open/closed state of a sound guide channel between the sound element and a sound-emitting hole.

17. The method according to claim 16, wherein the control components are disposed on all sound guide channels that connect the first sound element and the second sound element to the outside of the terminal.

18. The method according to claim 16, wherein the control components are disposed on a sound guide channel between the first sound element and the left sound-emitting hole and a sound guide channel between the second sound element and the right sound-emitting hole.

19. The method according to claim 12, further comprising:
obtaining usage status information of the terminal; and
determining a usage scenario of the terminal based on the usage status information, wherein the usage scenario comprises a landscape/portrait stereo play scenario and a call scenario.

20. A non-transitory computer-readable medium comprising instructions, wherein when the computer program product is run on an electronic device, the electronic device is enabled to perform the method comprising:
when the terminal is configured to play stereo in a portrait mode, controlling the first sound element and the second sound element to play sound channels on different sides and emit a sound from the left sound-emitting hole and the right sound-emitting hole; or
when the terminal is configured to play stereo in a landscape mode, controlling at least one of the first sound element and the second sound element to play a sound channel on one side and emit a sound from at least one of the left sound-emitting hole, the right sound-emitting hole, and the upper sound-emitting hole, and controlling the third sound element to play a sound channel on another side.

* * * * *